(12) United States Patent
Akiyama et al.

(10) Patent No.: US 10,745,887 B2
(45) Date of Patent: Aug. 18, 2020

(54) WORK MACHINE

(71) Applicant: HITACHI CONSTRUCTION MACHINERY CO., LTD., Tokyo (JP)

(72) Inventors: Yuki Akiyama, Hitachinaka (JP); Kenji Hiraku, Kasumigaura (JP); Hiromasa Takahashi, Abiko (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 203 days.

(21) Appl. No.: 15/752,980

(22) PCT Filed: Aug. 29, 2016

(86) PCT No.: PCT/JP2016/075240
§ 371 (c)(1),
(2) Date: Feb. 15, 2018

(87) PCT Pub. No.: WO2017/115493
PCT Pub. Date: Jul. 6, 2017

(65) Prior Publication Data
US 2018/0238028 A1 Aug. 23, 2018

(30) Foreign Application Priority Data
Dec. 28, 2015 (JP) .................. 2015-256096

(51) Int. Cl.
*E02F 9/22* (2006.01)
*F04B 51/00* (2006.01)
(Continued)

(52) U.S. Cl.
CPC ............ *E02F 9/2235* (2013.01); *E02F 9/226* (2013.01); *E02F 9/2289* (2013.01);
(Continued)

(58) Field of Classification Search
CPC ............. G01M 3/2876; G01M 3/2853; G01M 3/2861; G01M 3/2869; E21B 47/1025
(Continued)

(56) References Cited

U.S. PATENT DOCUMENTS 3,760,689 A * 9/1973 Johnston ............... E02F 9/2239
91/519
4,055,046 A * 10/1977 Schexnayder ........ F04B 49/002
60/428
(Continued)

FOREIGN PATENT DOCUMENTS

EP 3399190 * 7/2018 .............. F04B 49/10
JP 60-175790 A 9/1985
(Continued)

OTHER PUBLICATIONS

International Search Report of PCT/JP2016/075240 dated Nov. 29, 2016.

*Primary Examiner* — Clayton E. LaBalle
*Assistant Examiner* — Kevin C Butler
(74) *Attorney, Agent, or Firm* — Mattingly & Malur, PC

(57) ABSTRACT

A work machine that can detect abnormality such as a malfunction and wear and tear of each of hydraulic pumps including control equipment with high precision and that can reduce equipment cost is provided. A controller 9 according to the present invention includes a volumetric-transfer-efficiency-calculating section 94 that calculates a volumetric transfer efficiency $\eta_C$ representing a transfer efficiency of hydraulic oil between a hydraulic cylinder 11 and hydraulic pumps 21 to 23 on the basis of a target discharge flow rate calculated by a target-discharge-flow-rate-calculating section 932 and the speed of the hydraulic cylinder 11 that is detected by a speed sensor 28, and an abnormality decision section 95 that decides whether any one of the hydraulic pumps 21 to 23 is abnormal on the basis of the volumetric
(Continued)

transfer efficiency $\eta_C$ calculated by the volumetric-transfer-efficiency-calculating section 94.

3 Claims, 10 Drawing Sheets

(51) Int. Cl.
| | | |
|---|---|---|
| *F04B 49/10* | (2006.01) | |
| *E02F 9/26* | (2006.01) | |
| *F04B 49/06* | (2006.01) | |
| *F04B 49/08* | (2006.01) | |
| *G01M 3/28* | (2006.01) | |

(52) U.S. Cl.
CPC .......... *E02F 9/2292* (2013.01); *E02F 9/2296* (2013.01); *E02F 9/267* (2013.01); *E02F 9/268* (2013.01); *F04B 49/06* (2013.01); *F04B 49/08* (2013.01); *F04B 49/10* (2013.01); *F04B 49/103* (2013.01); *F04B 51/00* (2013.01); *G01M 3/2853* (2013.01); *G01M 3/2861* (2013.01); *G01M 3/2869* (2013.01); *G01M 3/2876* (2013.01)

(58) Field of Classification Search
USPC .......................................................... 73/46
See application file for complete search history.

(56) References Cited

U.S. PATENT DOCUMENTS

| | | | | | |
|---|---|---|---|---|---|
| 4,089,166 | A | * | 5/1978 | Ratliff | F15B 11/17 60/421 |
| 4,369,625 | A | * | 1/1983 | Izumi | E02F 9/2292 414/699 |
| 4,561,249 | A | * | 12/1985 | Watanabe | B66C 13/18 417/216 |
| 4,586,330 | A | * | 5/1986 | Watanabe | E02F 9/2221 60/421 |
| 4,875,337 | A | * | 10/1989 | Sugiyama | E02F 9/2239 60/421 |
| 5,007,543 | A | * | 4/1991 | Cooke | B66C 13/40 212/285 |
| 5,081,837 | A | * | 1/1992 | Ueno | E02F 9/2239 60/421 |
| 5,361,211 | A | * | 11/1994 | Lee | E02F 9/123 340/679 |
| 6,055,851 | A | * | 5/2000 | Tanaka | E02F 9/2235 73/40 |
| 6,098,322 | A | * | 8/2000 | Tozawa | E02F 3/437 37/414 |
| 7,506,507 | B2 | * | 3/2009 | Fransson | E02F 9/2217 60/443 |
| 7,604,300 | B2 | * | 10/2009 | Whitfield, Jr. | B60W 10/184 298/22 C |
| 7,921,641 | B2 | * | 4/2011 | Palo | E02F 9/2228 60/421 |
| 9,841,037 | B2 | * | 12/2017 | Tho | F15B 11/17 |
| 9,976,283 | B2 | * | 5/2018 | Tsuruga | F15B 11/17 |
| 10,060,451 | B2 | * | 8/2018 | Takahashi | E02F 9/2235 |
| 10,428,491 | B2 | * | 10/2019 | Joung | E02F 9/20 |
| 2003/0172650 | A1 | * | 9/2003 | Konishi | E02F 3/965 60/421 |
| 2004/0020467 | A1 | * | 2/2004 | Leman | F01L 9/021 123/467 |
| 2006/0191732 | A1 | * | 8/2006 | Lunzman | E02F 9/2235 180/307 |
| 2009/0036264 | A1 | * | 2/2009 | Tozawa | B60K 6/22 477/5 |
| 2009/0077837 | A1 | * | 3/2009 | Tozawa | E02F 9/2075 37/361 |
| 2009/0288408 | A1 | * | 11/2009 | Tozawa | E02F 9/2075 60/435 |
| 2010/0043420 | A1 | * | 2/2010 | Ikeda | E02F 9/2239 60/420 |
| 2012/0031087 | A1 | * | 2/2012 | Reynolds | F15B 11/0426 60/429 |
| 2013/0098011 | A1 | * | 4/2013 | Knussman | F15B 11/17 60/327 |
| 2013/0098015 | A1 | * | 4/2013 | Opdenbosch | E02F 9/2289 60/327 |
| 2013/0098017 | A1 | * | 4/2013 | Knussman | E02F 9/2242 60/327 |
| 2013/0098018 | A1 | * | 4/2013 | Knussman | F15B 7/006 60/327 |
| 2014/0060025 | A1 | * | 3/2014 | Cesur | F15B 21/08 60/327 |
| 2014/0090368 | A1 | * | 4/2014 | Bae | E02F 9/2242 60/422 |
| 2016/0025113 | A1 | * | 1/2016 | Hiraku | E02F 9/2235 60/428 |
| 2018/0038079 | A1 | * | 2/2018 | Amano | F15B 11/17 |
| 2018/0238028 | A1 | * | 8/2018 | Akiyama | F04B 49/10 |

FOREIGN PATENT DOCUMENTS

| | | | |
|---|---|---|---|
| JP | 62-020681 A | 1/1987 | |
| JP | 10-054370 A | 2/1998 | |
| JP | 2000-205141 A | 7/2000 | |
| JP | 2001-241384 A | 9/2001 | |
| JP | 2003-301810 A | 10/2003 | |
| JP | 2017120039 | * 7/2017 | ............. F04B 49/06 |

* cited by examiner

WORK MACHINE

TECHNICAL FIELD

The present invention relates to a work machine that detects abnormality, such as a malfunction and wear and tear, of a hydraulic pump.

BACKGROUND ART

In the case where a hydraulic system with which a work machine such as a hydraulic excavator is equipped operates for a long period of time, a reduction in performance of, especially, a hydraulic pump of main components of the hydraulic system due to wear and tear cannot be avoided. For this reason, the hydraulic pump is typically replaced periodically to maintain the performance of the hydraulic system and to avoid a risk of the occurrence of, for example, a malfunction and wear and tear of the hydraulic pump as much as possible.

In some cases, however, such a preventive measure increases cost when the degree of wear and tear of the hydraulic pump is excessively estimated and the period of a replacement cycle is too short, or cannot sufficiently reduce the frequency of the reduction in performance and the malfunction of the hydraulic pump, which affect works, when the period of the replacement cycle is too long. For this reason, it is necessary to know the state of the hydraulic pump with high precision during normal operation of the work machine. In a conventional technique against this problem, the amount of drain of the hydraulic pump is measured to estimate the degree of wear and tear of the hydraulic pump by using a property of a drain flow rate that increases with an increase in gaps between the components of the hydraulic pump due to wear.

A pump monitoring device of a hydraulic work machine that supplies hydraulic oil that is discharged from variable displacement hydraulic pumps and that merges through a check valve to an actuator to drive a work member is known as another conventional technique, and the pump monitoring device monitors whether any one of the variable displacement hydraulic pumps malfunctions on the basis of the total flow rate of the hydraulic oil discharged from the variable displacement hydraulic pumps (see, for example, PTL 1).

CITATION LIST

Patent Literature

PTL 1: Japanese Unexamined Patent Application Publication No. 2001-241384

SUMMARY OF INVENTION

Technical Problem

The former conventional technique that uses the property of the increasing drain flow rate is based on heuristics of the relationship between a reduction in the performance of the hydraulic pump and an increase in the drain flow rate, and accordingly, the values of the drain flow rate that are continuously measured need to be statistically processed to improve the accuracy of estimation of the degree of wear and tear of the hydraulic pump. Abnormality such as a malfunction of equipment that controls the displacement of a variable displacement hydraulic pump, for example, a regulator cannot be estimated from the measured values of the drain flow rate, and it is necessary to use another abnormality detector that detects the abnormality of the regulator.

The latter conventional technique in PTL 1 needs a flow rate sensor serving as an actual-flow-rate-detecting means that meets conditions such as dimensions, a weight, and a pressure loss that enable the work machine to be equipped therewith and that ensures the accuracy of detection of the flow rate of the hydraulic oil discharged from the variable displacement hydraulic pumps. However, although such a flow rate sensor has been known, the flow rate sensor itself is very expensive, it is impractical to equip the work machine therewith, and there is a need to develop a new flow rate sensor suitable as the actual-flow-rate-detecting means. For this reason, there is a concern that the conventional technique in PTL 1 leads to an increase in equipment cost and is difficult to carry out for economic reasons.

The present invention has been accomplished in view of such circumstances of the conventional techniques, and it is an object of the present invention to provide a work machine that can detect abnormality such as a malfunction and wear and tear of each of hydraulic pumps including control equipment with high precision and that can reduce equipment cost.

Solution to Problem

To solve the above problems, a work machine according to the present invention includes an actuator, hydraulic pumps that drive the actuator, a merge circuit on which hydraulic oil discharged from the hydraulic pumps merges and acts on the actuator, a controller that controls a discharge flow rate of each of the hydraulic pumps, and a speed detector that detects a speed of the actuator. The controller includes a target-command-value-obtaining section that obtains a target command value of the discharge flow rate of each of the hydraulic pumps, a volumetric-transfer-efficiency-calculating section that calculates a volumetric transfer efficiency representing a transfer efficiency of the hydraulic oil between the actuator and the hydraulic pumps on a basis of the target command value obtained by the target-command-value-obtaining section and the speed of the actuator that is detected by the speed detector, and an abnormality decision section that decides whether any one of the hydraulic pumps is abnormal on a basis of the volumetric transfer efficiency calculated by the volumetric-transfer-efficiency-calculating section.

Advantageous Effects of Invention

The work machine according to the present invention can detect abnormality such as a malfunction and wear and tear of each hydraulic pump including control equipment with high precision and can reduce equipment cost. The following description of embodiments reveals other problems, configurations, and effects other than those described above.

DESCRIPTION OF EMBODIMENTS

Embodiments for carrying out a work machine according to the present invention will hereinafter be described with reference to the drawings.

First Embodiment

Figure 1:
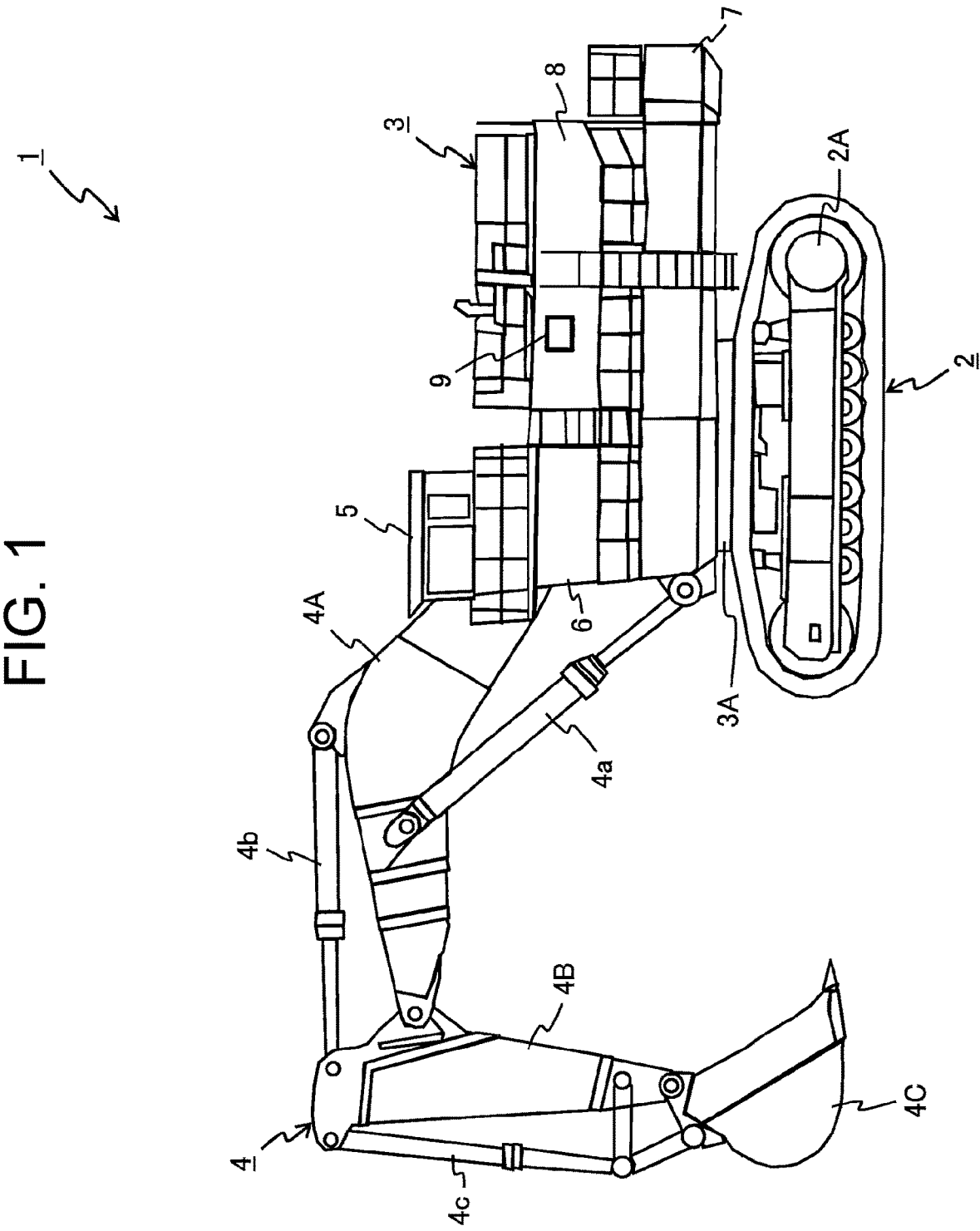
FIG. 1 illustrates the appearance of a large hydraulic excavator taken as an example of a work machine according to a first embodiment of the present invention.

Examples of a work machine according to a first embodiment of the present invention include a large hydraulic excavator 1 used for works such as open-pit mining as illustrated in FIG. 1. The hydraulic excavator 1 includes a travel base 2 including a crawler-type track device 2A, an upperstructure 3 that is rotatably disposed above the travel base 2 with a rotating device 3A interposed therebetween, and a front working device 4 that is mounted in front of the upperstructure 3 and that swings in the vertical direction for works such as excavation.

The upperstructure 3 includes a cab 5 that is located at a front portion and into which an operator gets to operate the front working device 4, a cab bed 6 that is located below the cab 5 and that supports the cab 5, a counterweight 7 that is located at a rear portion and that balances a vehicle body to prevent the vehicle body from inclining, an engine room 8 that is located between the cab bed 6 and the counterweight 7 and that accommodates an engine 20, hydraulic pumps 21 to 23 (see FIG. 2) described later, and other components, and a controller 9 that controls the entire operation of the vehicle body including the discharge flow rate of each of the hydraulic pumps 21 to 23.

The front working device 4 includes a boom 4A that has a base end mounted on the upperstructure 3 in a swingable manner and that swings in the vertical direction with respect to the vehicle body, an arm 4B that is mounted on a front end of the boom 4A in a swingable manner and that swings in the vertical direction with respect to the vehicle body, and a bucket 4C that is mounted on a front end of the arm 4B in a swingable manner and that swings in the vertical direction with respect to the vehicle body.

The front working device 4 also includes a boom cylinder 4a that connects the upperstructure 3 and the boom 4A to each other and that expands and contracts to cause the boom 4A to swing, an arm cylinder 4b that connects the boom 4A and the arm 4B to each other and that expands and contracts to cause the arm 4B to swing, and a bucket cylinder 4c that connects the arm 4B and the bucket 4C to each other and that expands and contracts to cause the bucket 4C to swing.

The boom cylinder 4a, the arm cylinder 4b, and the bucket cylinder 4c function as actuators and each form a hydraulic cylinder 11 (see FIG. 2) that is driven by using hydraulic oil. In the following description, when it is not necessary to distinguish the boom cylinder 4a, the arm cylinder 4b, and the bucket cylinder 4c, these cylinders are referred to as the hydraulic cylinder 11 as a general term.

The cab 5 includes an operating lever 5A (see FIG. 3) that is electrically connected to the controller 9 and that serves as an operating device for operating the hydraulic cylinder 11, and an information device that informs information about the components of the hydraulic excavator 1 including the state of each of the hydraulic pumps 21 to 23 to an operator, for example, a monitor 5B that displays an image or letters representing the information. The direction and speed of movement of the hydraulic cylinder 11 are predetermined in accordance with the direction of operation of the operating lever 5A and a manipulated variable thereof. Instead of the monitor 5B, examples of the information device may include an audio output device such as a speaker that outputs the information about the components of the hydraulic excavator 1 by using sounds.

The controller 9 includes a CPU (Central Processing Unit) that performs operations to control the entire operation of the vehicle body, a storage device such as a ROM (Read Only Memory) or a HDD (Hard Disk Drive) that stores programs that cause the CPU to perform the operations, and hardware including a RAM (Random Access Memory) that is a working area when the CPU runs the programs, although these are not illustrated.

With such a hardware configuration, the programs that are stored in a storage medium such as the ROM, the HDD, or an optical disk, not illustrated, are loaded into the RAM and run in accordance with the control of the CPU. Consequently, the programs (software) and the hardware work together and form a function block that achieves the function of the controller 9. The functional configuration of the controller 9, which is a feature of the first embodiment of the present invention, will be described in detail later.

Figure 2:
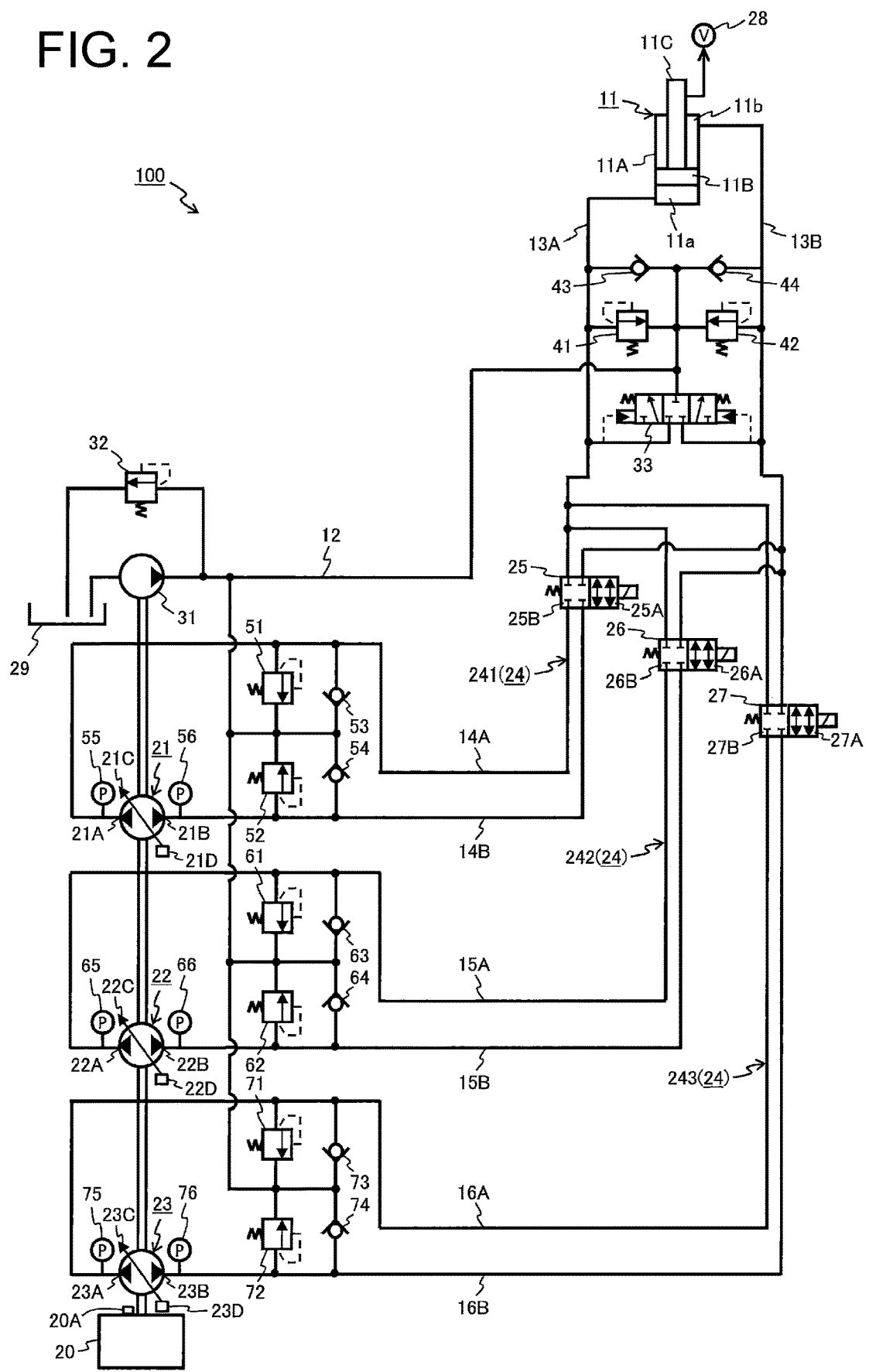
FIG. 2 illustrates an example of the configuration of a hydraulic circuit included in the hydraulic excavator illustrated in FIG. 1.

FIG. 2 illustrates the configuration of a hydraulic circuit 100 for driving the hydraulic cylinder 11 according to the first embodiment of the present invention.

As illustrated in FIG. 2, the hydraulic cylinder 11 includes a cylinder tube 11A to which the hydraulic oil is supplied, a piston 11B that is accommodated in the cylinder tube 11A in a slidable manner and that partitions the inside of the cylinder tube 11A into a head-side oil chamber (or a bottom chamber) 11a and a rod-side oil chamber 11b, and a piston rod 11C that is partially accommodated in the rod-side oil chamber 11b of the cylinder tube 11A and that is coupled at a base end thereof to the piston 11B.

In the hydraulic cylinder 11 thus configured, when the hydraulic oil is supplied to the head-side oil chamber 11a of the cylinder tube 11A, the pressure in the head-side oil chamber 11a increases to push the piston 11B toward the rod-side oil chamber 11b, and the piston rod 11C shifts toward the outside of the cylinder tube 11A. When the hydraulic oil is supplied to the rod-side oil chamber 11b of the cylinder tube 11A, the pressure in the rod-side oil chamber 11b increases to push the piston 11B back toward the head-side oil chamber 11a, and the piston rod 11C shifts toward the inside of the cylinder tube 11A.

The hydraulic circuit 100 according to the first embodiment of the present invention is disposed in the upperstructure 3 and drives the hydraulic cylinder 11 in response to the operation of the operating lever 5A in the cab 5. Specifically, the hydraulic circuit 100 includes the engine 20 serving as a motor, and the variable displacement hydraulic pumps (three hydraulic pumps according to the present embodiment) 21 to 23 each of which has an input shaft that is coaxial with an output shaft of the engine 20 and is driven by the engine 20, and adjusts the discharge flow rate of each of the hydraulic pumps 21 to 23 to control the speed of the hydraulic cylinder 11 for displacement control.

The hydraulic circuit 100 also includes a merge circuit 24 on which hydraulic oil discharged from the hydraulic pumps 21 to 23 merges and acts on the hydraulic cylinder 11, switching valves 25 to 27 that switch connection between the hydraulic cylinder 11 and each of the hydraulic pumps 21 to 23 on the merge circuit 24, a speed sensor 28 serving as a speed detector that is electrically connected to the controller 9 and that detects the speed of the hydraulic cylinder 11, and a hydraulic oil tank 29 that stores hydraulic oil to be supplied to the hydraulic pumps 21 to 23.

In addition to the hydraulic pumps 21 to 23, a charge pump 31 is connected to the output shaft of the engine 20. The charge pump 31 is connected on the discharge side to a flow pass 12. The flow pass 12 is connected to the hydraulic oil tank 29 with a relief valve 32 interposed therebetween. The relief valve 32 discharges the hydraulic oil in the flow pass 12 into the hydraulic oil tank 29 when the pressure in the flow pass 12 exceeds a predetermined pressure.

The charge pump 31 is connected on the suction side to the hydraulic oil tank 29. The charge pump 31 sucks the hydraulic oil in the hydraulic oil tank 29 and discharges the hydraulic oil into the flow pass 12. A rotational speed sensor 20A that detects the rotational speed of the engine 20, that is, the rotational speed of the hydraulic pumps 21 to 23 is mounted on the engine 20. The rotational speed sensor 20A is electrically connected to the controller 9.

The hydraulic pump 21 includes a pair of input-output ports 21A and 21B via which the hydraulic oil is sucked or discharged, and a two-way tilting swash plate mechanism including a two-way tilting swash plate 21C that adjusts amounts in which the hydraulic oil is sucked and discharged via the input-output ports 21A and 21B and directions in which the hydraulic oil is sucked and discharged via the input-output ports 21A and 21B. The hydraulic pump 21 includes a regulator 21D that controls the displacement of the hydraulic pump 21 in a manner in which the tilt angle of the swash plate 21C is adjusted. The regulator 21D is electrically connected to the controller 9 and controls suction and discharge directions and suction and discharge flow rates of the input-output ports 21A and 21B of the hydraulic pump 21 by using electric control signals sent from the controller 9.

A flow pass 14A connected to the head-side oil chamber 11a of the hydraulic cylinder 11 and a flow pass 14B connected to the rod-side oil chamber 11b of the hydraulic cylinder 11 are mounted on the pair of the input-output ports 21A and 21B of the hydraulic pump 21. An end of the flow pass 14A is connected to the input-output port 21A of the hydraulic pump 21. The other end of the flow pass 14A is connected to a flow pass 13A with the switching valve 25 interposed therebetween, and the flow pass 13A is connected to the head-side oil chamber 11a of the hydraulic cylinder 11.

An end of the flow pass 14B is connected to the other input-output port 21B of the hydraulic pump 21. The other end of the flow pass 14B is connected to a flow pass 13B with the switching valve 25 interposed therebetween, and the flow pass 13B is connected to the rod-side oil chamber 11b of the hydraulic cylinder 11. Accordingly, the hydraulic cylinder 11 and the hydraulic pump 21 are connected to each other in a closed circuit manner with the flow passes 13A, 13B, 14A, and 14B and the switching valve 25 interposed therebetween, and a closed circuit 241 on which the hydraulic cylinder 11 is directly driven by the hydraulic pump 21 is formed.

The closed circuit 241 includes a flushing valve 33 that connects a low-pressure-side flow pass of the flow passes 13A and 13B to the flow pass 12 and that discharges the hydraulic oil in the low-pressure-side flow pass into the flow pass 12, relief valves 41 and 42 that discharge the hydraulic oil in the flow passes 13A and 13B into the flow pass 12 when pressures in the flow passes 13A and 13B exceed a predetermined pressure, and make-up valves 43 and 44 that supply the hydraulic oil discharged from the charge pump 31 from the flow pass 12 to the flow passes 13A and 13B when the pressures in the flow passes 13A and 13B become less than a predetermined pressure.

The closed circuit 241 also includes relief valves 51 and 52 that discharge the hydraulic oil in the flow passes 14A and 14B into the flow pass 12 when the pressures in the flow passes 14A and 14B exceed a predetermined pressure, make-up valves 53 and 54 that supply the hydraulic oil discharged from the charge pump 31 from the flow pass 12 to the flow passes 14A and 14B when the pressures in the flow passes 14A and 14B become less than a predetermined pressure, and pressure sensors 55 and 56 that are mounted on the flow passes 14A and 14B near the input-output ports 21A and 21B of the hydraulic pump 21 and that serve as pressure detectors that detect the pressures in the flow passes 14A and 14B, that is, suction and discharge pressures of the hydraulic pump 21. The pressure sensors 55 and 56 are electrically connected to the controller 9.

A closed circuit 242 and a closed circuit 243 that include the hydraulic pump 22 and the hydraulic pump 23 are the same as the above closed circuit 241, and a description thereof is omitted. The switching valves 26 and 27 are the same as the above switching valve 25, and a description thereof is omitted.

In the hydraulic circuit 100 thus configured, when the switching valves 25 to 27 are switched to open positions 25A to 27A in accordance with control signals from the controller 9, the hydraulic oil discharged from the hydraulic pumps 21 to 23 merges on the downstream side of the switching valves 25 to 27, the hydraulic oil that has merged acts on the hydraulic cylinder 11, and this enables a driving force of the hydraulic cylinder 11 that is needed for works of the large hydraulic excavator 1 to be obtained.

Figure 3:
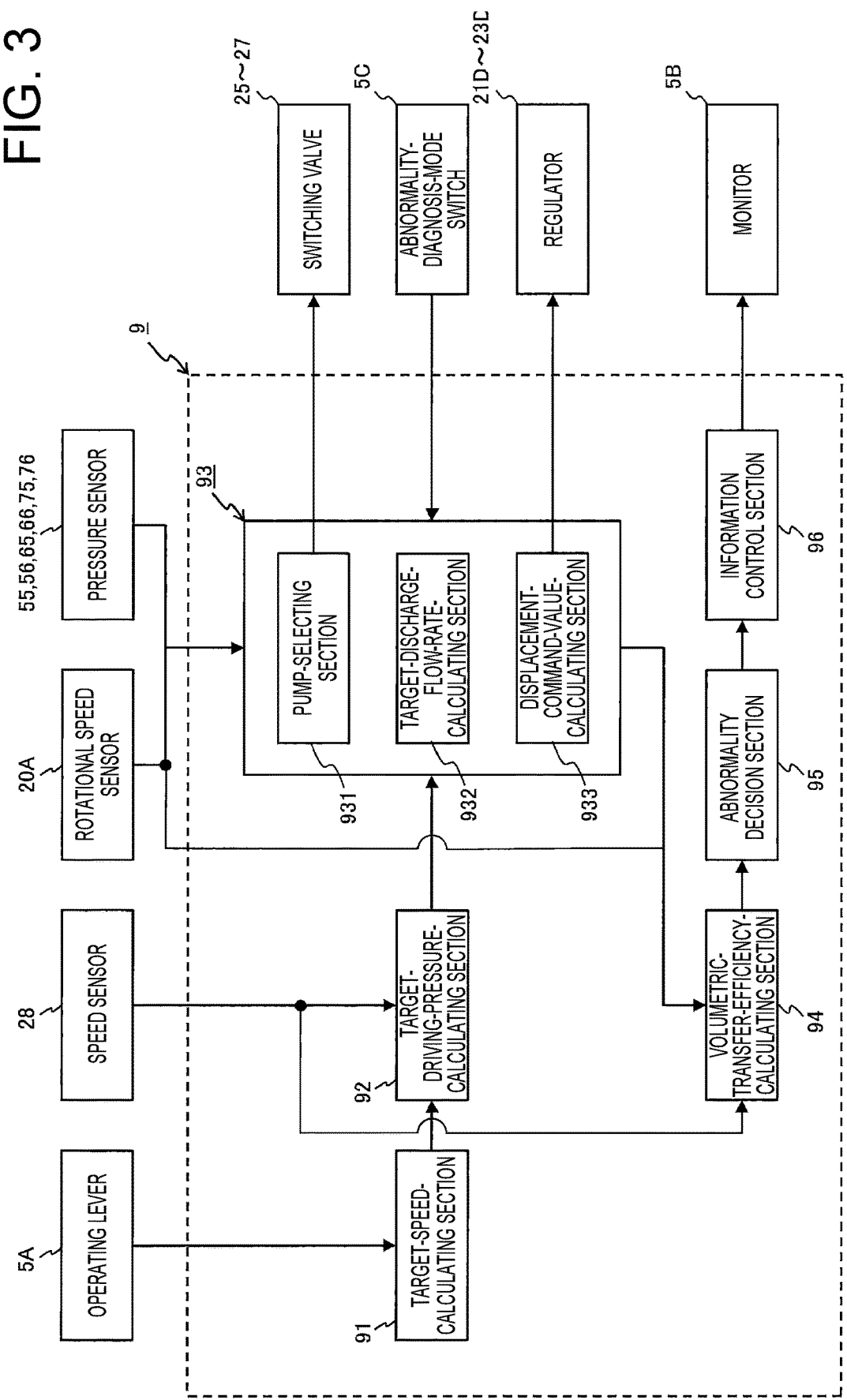
FIG. 3 is a functional block diagram illustrating the configuration of a controller illustrated in FIG. 1.

The functional configuration of the controller 9, which is a feature of the first embodiment of the present invention, will now be described in detail with reference to FIG. 3.

The controller 9 according to the first embodiment of the present invention includes a target-speed-calculating section 91 that calculates a target speed of the hydraulic cylinder 11 to be moved on the basis of the manipulated variable of the operating lever 5A, a target-driving-pressure-calculating section 92 that calculates a target driving pressure for driving the hydraulic cylinder 11 on the basis of the speed of the hydraulic cylinder 11 that is detected by the speed sensor 28 and the target speed calculated by the target-speed-calculating section 91, and a pump-switching valve control section 93 that controls operation of the hydraulic pumps 21 to 23 and the switching valves 25 to 27 in accordance with the pressures of the input-output ports 21A to 23A and 21B to 23B that are detected by the pressure sensors 55, 56, 65, 66, 75, and 76 and the target driving pressure calculated by the target-driving-pressure-calculating section 92.

The target-speed-calculating section 91 stores the relationship between the manipulated variable of the operating lever 5A and the target speed of the hydraulic cylinder 11 in advance. The target-speed-calculating section 91 calculates the target speed of the hydraulic cylinder 11 on the basis of the above relationship in a manner in which an operation signal of the operating lever 5A is inputted and the manipulated variable of the operating lever 5A is used in the above relationship. According to the first embodiment of the present invention, when the sign of the speed of the hydraulic cylinder 11 is positive, the hydraulic cylinder 11 expands, and when the sign of the speed of the hydraulic cylinder 11 is negative, the hydraulic cylinder 11 contracts.

The target-driving-pressure-calculating section 92 calculates the target driving pressure needed to equalize the speed of the hydraulic cylinder 11 with the target speed so as to eliminate the difference between the speed of the hydraulic cylinder 11 that is detected by the speed sensor 28 and the target speed calculated by the target-speed-calculating section 91. The target-driving-pressure-calculating section 92 outputs the calculated target driving pressure to the pump-switching valve control section 93 as the total target discharge pressure of the hydraulic pumps 21 to 23.

The pump-switching valve control section 93 includes a pump-selecting section 931 that selects at least one of the hydraulic pumps for driving the hydraulic cylinder 11 from the hydraulic pumps 21 to 23, a target-discharge-flow-rate-calculating section 932 that calculates the target discharge flow rate of each of the hydraulic pumps 21 to 23 in accordance with the result of selection by the pump-selecting section 931, and a displacement-command-value-calculating section 933 that calculates a displacement command value corresponding to the target discharge flow rate of each of the hydraulic pumps 21 to 23 that is calculated by the target-discharge-flow-rate-calculating section 932, that is, the target command value of the discharge flow rate of each of the hydraulic pumps 21 to 23.

The pump-selecting section 931 sends, to the switching valve(s) corresponding to the at least one of the hydraulic pumps selected from the switching valves 25 to 27, a control signal to cause the switch position thereof to be maintained at the open position, and sends, to the other switching valve(s), a control signal to cause the switch position thereof to be maintained at the close position. A process of selection from the hydraulic pumps 21 to 23 by the pump-selecting section 931 will be described in detail later.

The target-discharge-flow-rate-calculating section 932 calculates the target discharge flow rate at the discharge pressure of the at least one of the hydraulic pumps selected by the pump-selecting section 931 so as to eliminate the difference between the pressure on the discharge side of the input-output ports that is detected by the pressure sensor(s) corresponding to the at least one of the hydraulic pumps and the target driving pressure calculated by the target-driving-pressure-calculating section 92. According to the first embodiment of the present invention, when the sign of the target discharge flow rate of the hydraulic pump 21 is positive, the hydraulic pump 21 sucks the hydraulic oil from the input-output port 21B and discharges the hydraulic oil from the input-output port 21A, and when the sign of the target discharge flow rate of the hydraulic pump 21 is negative, the hydraulic pump 21 sucks the hydraulic oil from the input-output port 21A and discharges the hydraulic oil from the input-output port 21B.

The target-discharge-flow-rate-calculating section 932 calculates percentages of the target discharge flow rate that are assigned to the hydraulic pumps 21 to 23 in accordance with the result of selection from the hydraulic pumps 21 to 23 by the pump-selecting section 931. The displacement-command-value-calculating section 933 calculates the displacement command value for controlling the displacement (displacement volume) of the hydraulic pumps 21 to 23 on the basis of the target discharge flow rate of the at least one of the hydraulic pumps selected from the hydraulic pumps 21 to 23, and the rotational speed of the engine 20 that is detected by the rotational speed sensor 20A, that is, the rotational speed of the hydraulic pumps 21 to 23.

The pump-switching valve control section 93 sends a control signal of the displacement command value calculated by the displacement-command-value-calculating section 933 to the regulators 21D to 23D of the corresponding hydraulic pumps 21 to 23 and sends the result of selection by the pump-selecting section 931, the result of calculation by the target-discharge-flow-rate-calculating section 932, and the result of calculation by the displacement-command-value-calculating section 933 to a volumetric-transfer-efficiency-calculating section 94 described later. The pump-switching valve control section 93 thus functions as a target-command-value-obtaining section that obtains the target command value of the discharge flow rate of each of the hydraulic pumps 21 to 23.

The controller 9 includes the volumetric-transfer-efficiency-calculating section 94 that calculates a volumetric transfer efficiency $\eta_C$ representing the transfer efficiency of the hydraulic oil between the hydraulic cylinder 11 and the hydraulic pumps 21 to 23 on the basis of the speed of the hydraulic cylinder 11 that is detected by the speed sensor 28, the rotational speed of the hydraulic pumps 21 to 23 that is detected by the rotational speed sensor 20A, the result of selection by the pump-selecting section 931, the result of calculation by the target-discharge-flow-rate-calculating section 932, and the result of calculation by the displacement-command-value-calculating section 933.

The controller 9 also includes an abnormality decision section 95 that decides whether any one of the hydraulic pumps 21 to 23 has abnormality such as a malfunction or wear and tear on the basis of the volumetric transfer efficiency $\eta_C$ calculated by the volumetric-transfer-efficiency-calculating section 94, and an information control section 96 that causes the monitor 5B to display the result of decision when the abnormality decision section 95 decides that any one of the hydraulic pumps 21 to 23 is abnormal.

A process of calculating the volumetric transfer efficiency $\eta_C$ by using the volumetric-transfer-efficiency-calculating section 94 and a process of deciding whether any one of the hydraulic pumps 21 to 23 is abnormal by using the abnormality decision section 95 will be described in detail below. To make the description easy to understand, what will now be described is the case where the switching valve 25 is switched to the open position 25A, the switching valves 26 and 27 are switched to a close position 26B and 27B respectively, and the hydraulic pump 21 alone drives the hydraulic cylinder 11. The same is true for the case where the hydraulic pump 22 or 23 alone drives the hydraulic cylinder 11, and a duplicated description is omitted.

The hydraulic circuit 100 according to the first embodiment of the present invention is a system for displacement control as described above. Accordingly, regarding the flow rate of the hydraulic oil discharged from the hydraulic pump 21, all of the hydraulic oil except for a small oil leak across the closed circuit 241 flows into the hydraulic cylinder 11 unless the pressure in the hydraulic circuit 100 exceeds pressures set to the relief valves 41, 42, 51, and 52 and the hydraulic oil flows into the flow pass 12.

It is here assumed that the pressures in the flow passes 13A, 13B, 14A, and 14B that connect the hydraulic cylinder 11 and the hydraulic pump 21 to each other are less than the pressures set to the relief valves 41, 42, 51, and 52 and are higher than the pressure in the flow pass 12 upstream of the make-up valves 43, 44, 53, and 54, and that the hydraulic oil does not flow between the flow passes 13A, 13B, 14A, and 14B and the flow pass 12.

In the hydraulic circuit 100, the theoretical value $Q_{OUT}$ of the discharge flow rate when the volumetric efficiency of the hydraulic pump 21 is 100% is expressed as the following numerical formula (1), where C is the displacement command value of the hydraulic pump 21 per rotation, and R is the rotational speed of the hydraulic pump 21.

[Math. 1]

$$Q_{OUT} = C \cdot R \quad (1)$$

The flow rate $Q_{IN}$ of the hydraulic oil flowing into the hydraulic cylinder 11 is expressed as the following numerical formula (2), wherein V is the speed of the hydraulic cylinder 11, and A is a pressure-receiving area of the piston 11B of the hydraulic cylinder 11.

[Math. 2]

$$Q_{IN} = A \cdot V \quad (2)$$

When the theoretical value $Q_{OUT}$ of the discharge flow rate of the hydraulic pump 21 is equal to the flow rate $Q_{IN}$ of the hydraulic oil flowing into the hydraulic cylinder 11, the following numerical formula (3) holds.

[Math. 3]

$$V = \frac{C \cdot R}{A} \quad (3)$$

That is, the following numerical formula (4) is given from the numerical formula (3).

[Math. 4]

$$V \propto C \quad (4)$$

According to the numerical formula (4), in theory, the speed V of the hydraulic cylinder 11 is proportional to the displacement command value C of the hydraulic pump 21. However, in practice, the flow rate $Q_{IN}$ of the hydraulic oil flowing into the hydraulic cylinder 11 is less than the theoretical value $Q_{OUT}$ of the discharge flow rate of the hydraulic pump 21 and varies because of an effect on the volumetric efficiency due to, mainly, a leak in the hydraulic pump 21 itself and an effect of the above leak across the closed circuit 241.

In view of this, according to the first embodiment of the present invention, the volumetric transfer efficiency $\eta_C$ is defined as a ratio of the flow rate $Q_{IN}$ of the hydraulic oil flowing into the hydraulic cylinder 11 to the discharge flow rate $Q_{OUT}$ of the hydraulic pump 21. That is, from the numerical formulas (1) and (2), the volumetric transfer efficiency $\eta_C$ is expressed as the following numerical formula (5).

[Math. 5]

$$\eta_C = \frac{Q_{IN}}{Q_{OUT}} = \frac{A \cdot V}{C \cdot R} \quad (5)$$

The volumetric-transfer-efficiency-calculating section 94 according to the first embodiment of the present invention calculates the volumetric transfer efficiency $\eta_C$ in a manner in which the pressure-receiving area A of the piston 11B of the hydraulic cylinder 11 that is stored in the controller 9 in advance, the speed V of the hydraulic cylinder 11 that is detected by the speed sensor 28, the rotational speed R of the hydraulic pump 21 that is detected by the rotational speed sensor 20A, and the displacement command value C of the hydraulic pump 21 that is calculated by the displacement-command-value-calculating section 933 are substituted in the numerical formula (5).

The effect of a leak in, for example, the hydraulic cylinder 11 and the switching valve 25 is relatively subtle although the effect varies, and accordingly, attention is paid to the hydraulic pump 21.

The theoretical value of the volumetric transfer efficiency $\eta_C$ calculated by the volumetric-transfer-efficiency-calculating section 94 is 1. When the volumetric transfer efficiency $\eta_C$ is less than 1, the smaller the volumetric transfer efficiency $\eta_C$, the more the speed of the hydraulic cylinder 11 that is equal to the displacement command value is difficult to obtain. This means that the performance of the hydraulic pump 21 is reduced. The volumetric transfer efficiency $\eta_C$ is less than the theoretical value because of a problem such as the above leak even when the hydraulic pumps 21 to 23 normally operate. Accordingly, the abnormality decision section 95 decides that the hydraulic pump 21 is not abnormal when the volumetric transfer efficiency $\eta_C$ calculated by the volumetric-transfer-efficiency-calculating section 94 falls within a predetermined normal value range, and decides that the hydraulic pump 21 is abnormal when the volumetric transfer efficiency $\eta_C$ calculated by the volumetric-transfer-efficiency-calculating section 94 falls outside the predetermined normal value range.

Actual measurement in a state where another measure reveals in advance that the hydraulic pump 21 is not abnormal enables the above normal value range to be most accurately grasped. However, it is only necessary for this to be accurately grasped to such a degree that precision required for the result of decision whether the hydraulic pump 21 is abnormal is obtained. If it suffices that decision that the hydraulic pump 21 is abnormal can be made only when the volumetric transfer efficiency $\eta_C$ of the hydraulic pump 21 decreases to less than half of the theoretical value, the lower limit of the normal value of the volumetric transfer efficiency $\eta_C$ is determined to be 0.5.

When the regulator 21D that controls the displacement of the hydraulic pump 21 or a system that transmits a control signal of the displacement command value is abnormal, the discharge flow rate of the hydraulic pump 21 can be equal to or more than the discharge flow rate corresponding to the displacement command value. In this case, the volumetric transfer efficiency $\eta_C$ calculated by the volumetric-transfer-efficiency-calculating section 94 is more than the normal value.

At this time, it is only necessary for the normal value range to be accurately grasped to such a degree that precision required for the result of decision whether the hydraulic pump 21 is abnormal is obtained as in the case where the volumetric transfer efficiency $\eta_C$ of the hydraulic pump 21 decreases. For example, when the volumetric transfer efficiency $\eta_C$ calculated by the volumetric-transfer-efficiency-calculating section 94 exceeds 1, which is the theoretical value, the hydraulic pump 21 surely has abnormality, the abnormality that the hydraulic pump 21 surely has can be decided even when the normal value range is not accurately gasped.

What will now be described is the case where the hydraulic pumps 21 to 23 drive the hydraulic cylinder 11 in a manner in which at least two switching valves of the switching valves 25 to 27 are switched to the open position. In the case where the hydraulic excavator 1 includes two or more hydraulic cylinders 11 that are driven in conjunction with each other, these hydraulic cylinders 11 are handled as one system as in the case of the hydraulic cylinder 11.

In the hydraulic circuit 100 according to the first embodiment of the present invention, how many hydraulic pumps of the hydraulic pumps 21 to 23 are used to drive the hydraulic cylinders 11 and which hydraulic pump is used can be selected in a manner in which the pump-selecting section 931 switches the switching valves 25 to 27 to the open positions 25A to 27A, or to the close positions 25B to 27B. For example, in the case where the pump-selecting section 931 selects the three hydraulic pumps 21 to 23, the volumetric transfer efficiency $\eta_C$ at this time is expressed as the following numerical formula (6), wherein $C_1$, $C_2$, and $C_3$ are the displacement command values of the hydraulic pumps 21 to 23. Among the displacement command values $C_L$, $C_2$, and $C_3$ of the hydraulic pumps 21 to 23, the displacement command value when the hydraulic cylinder 11 is not connected thereto is 0.

[Math. 6]

$$\eta_C = \frac{Q_{IN}}{Q_{OUT}} = \frac{A \cdot V}{(C_1 + C_2 + C_3) \cdot R} \quad (6)$$

The volumetric transfer efficiency $\eta_C$ calculated by the numerical formula (6) is defined as the ratio of the flow rate of the hydraulic oil flowing into the hydraulic cylinder 11 to the sum of the discharge flow rate of each of the hydraulic pumps 21 to 23 by using the sum of the displacement command values $C_1$, $C_2$, and $C_3$ of the hydraulic pumps 21 to 23. The presence or absence of abnormality of each of the hydraulic pumps 21 to 23 cannot be decided by using only the volumetric transfer efficiency $\eta_C$.

In view of this, according to the first embodiment of the present invention, information about the volumetric transfer efficiency $\eta_C$ in different states of the hydraulic oil that is discharged from the hydraulic pumps 21 to 23 and that merges, that is, in different states of connection between the hydraulic cylinder 11 and the hydraulic pumps 21 to 23 is used to identify the hydraulic pump that causes a reduction of the volumetric transfer efficiency $\eta_C$, and the presence or absence of abnormality of this hydraulic pump is decided.

Specifically, the first embodiment of the present invention provides an abnormality-diagnosis-mode-setting section that sets an abnormality diagnosis mode in which abnormality of each of the hydraulic pumps 21 to 23 is diagnosed. The abnormality-diagnosis-mode-setting section includes an abnormality-diagnosis-mode switch 5C that is disposed, for example, in the cab 5 and that is pushed by an operator.

When the abnormality diagnosis mode is set by using the abnormality-diagnosis-mode switch 5C, in a state where the hydraulic cylinder 11 in one system is connected to only one of the hydraulic pumps 21 to 23 by using the switching valves 25 to 27, the controller 9 causes the abnormality decision section 95 to decide whether the one of the hydraulic pumps is abnormal.

In the case where one of the hydraulic pumps alone is connected to the hydraulic cylinder 11 at the same time, the volumetric transfer efficiency $\eta_C$ between the hydraulic cylinder 11 and the one of the hydraulic pumps can be calculated even in a system that drives the hydraulic cylinder 11 in one system by using the hydraulic oil that is discharged from the hydraulic pumps 21 to 23 and that merges as in the hydraulic circuit 100 according to the first embodiment of the present invention.

For example, while the hydraulic pump 21 alone is connected to the hydraulic cylinder 11, the displacement command values $C_2$ and $C_3$ of the other hydraulic pumps 22 and 23 are 0. Accordingly, the volumetric-transfer-efficiency-calculating section 94 can calculate the volumetric transfer efficiency $\eta_C$ by using the numerical formula (5) as in the case of driving the hydraulic cylinder 11 by using only the hydraulic pump 21. Accordingly, the controller 9 enables the presence or absence of abnormality of each of the hydraulic pumps 21 to 23 to be individually decided in a manner in which the pump-selecting section 931 selects one of the hydraulic pumps 21 to 23 to change the hydraulic pump to be connected to the hydraulic cylinder 11 in turns.

Even while the abnormality diagnosis mode is not set by using the abnormality-diagnosis-mode switch 5C, abnormality of each of the hydraulic pumps 21 to 23 can be detected without affecting normal operation of the hydraulic excavator 1. There is the case where the hydraulic cylinder 11 slowly moves at a discharge flow rate assigned to one of the hydraulic pumps 21 to 23 during the operation of the hydraulic excavator 1 even in a system that drives the hydraulic cylinder 11 in one system by using the hydraulic oil that is discharged from the hydraulic pumps 21 to 23 and that merges as in the hydraulic circuit 100. Accordingly, the abnormality decision section 95 decides the presence or absence of abnormality of each of the hydraulic pumps 21 to 23 by using the volumetric transfer efficiency $\eta_C$ obtained with such timing.

While one of the hydraulic pumps 21 to 23 that continues to produce slow movement of the hydraulic cylinder 11 is not changed to another, the abnormality decision section 95 cannot decide the presence or absence of abnormality of the other hydraulic pumps, and accordingly, it is necessary to change how to connect the hydraulic cylinder 11. The abnormality decision section 95 can decide the presence or absence of abnormality of each of the hydraulic pumps 21 to 23 during the operation of the hydraulic excavator 1 in a manner in which the pump-selecting section 931 changes the hydraulic pump that is used for the slow movement of the hydraulic cylinder 11 each time.

However, as the period during which the hydraulic cylinder 11 is driven by using only one of the hydraulic pumps 21 to 23 decreases, the accuracy of the result of calculation of the volumetric transfer efficiency $\eta_C$ decreases by being affected by dynamic characteristics of the hydraulic system and a control system as described later. In this case, the presence or absence of abnormality of each of the hydraulic pumps 21 to 23 is preferably decided in a state where the hydraulic cylinder 11 is driven by using at least two hydraulic pumps of the hydraulic pumps 21 to 23 as described later.

The hydraulic circuit 100 according to the first embodiment of the present invention is a system in which the hydraulic cylinder 11 in one system is driven by using the hydraulic oil that is discharged from the hydraulic pumps 21 to 23 and that merges, and accordingly, there are several combinations of the hydraulic cylinder 11 and at least one of the hydraulic pumps 21 to 23 connected thereto when the number of the at least one of the hydraulic pumps 21 to 23 connected to the hydraulic cylinder 11 is less than the maximum number of connections (referred to below as the maximum connection number for convenience) that the switching valves 25 to 27 permit, that is, 2 or less. Accordingly, in the case where the volumetric transfer efficiency $\eta_C$ has different values for every combination of the hydraulic cylinder 11 and at least one of the hydraulic pumps 21 to 23 connected thereto, which hydraulic pump causes the different values can be identified.

For example, when the combination is formed of the hydraulic cylinder 11 and the hydraulic pump 21 and the hydraulic pump 22 that are connected thereto in the hydraulic circuit 100 illustrated in FIG. 2, a volumetric transfer efficiency $\eta_{C12}$ between the hydraulic cylinder 11 and the hydraulic pumps 21 and 22 is expressed as the following numerical formula (7).

[Math. 7]
$$\eta_{C12} = \frac{A \cdot V}{(C_1 + C_2) \cdot R} \quad (7)$$

When the combination is formed of the hydraulic cylinder 11 and the hydraulic pump 22 and the hydraulic pump 23 that are connected thereto, a volumetric transfer efficiency $\eta_{C23}$ between the hydraulic cylinder 11 and the hydraulic pumps 22 and 23 is expressed as the following numerical formula (8).

[Math. 8]
$$\eta_{C23} = \frac{A \cdot V}{(C_2 + C_3) \cdot R} \quad (8)$$

When the combination is formed of the hydraulic cylinder 11 and the hydraulic pump 21 and the hydraulic pump 23 that are connected thereto, a volumetric transfer efficiency $\eta_{C13}$ between the hydraulic cylinder 11 and the hydraulic pumps 21 and 23 is expressed as the following numerical formula (9).

[Math. 9]
$$\eta_{C13} = \frac{A \cdot V}{(C_1 + C_3) \cdot R} \quad (9)$$

When the combination is formed of the hydraulic cylinder 11 and the hydraulic pump 21, the hydraulic pump 22, and the hydraulic pump 23 that are connected thereto, a volumetric transfer efficiency $\eta_{C123}$ between the hydraulic cylinder 11 and the hydraulic pumps 21 to 23 is expressed as the following numerical formula (10).

[Math. 10]
$$\eta_{C123} = \frac{A \cdot V}{(C_1 + C_2 + C_3) \cdot R} \quad (10)$$

In the case where the volume transfer efficiencies $\eta_{C12}$, $\eta_{C23}$, $\eta_{C13}$, and $\eta_{C123}$ calculated by the numerical formulas (7) to (10) satisfy the following numerical formula (11), the hydraulic pump 21 causes differences among the volume transfer efficiencies $\eta_{C12}$, $\eta_{C23}$, $\eta_{C13}$, and $\eta_{C123}$ in each combination. At this time, it is assumed that the volumetric transfer efficiency $\eta_C$ in the case where the hydraulic cylinder 11 is driven by only the hydraulic pump 21 also decreases. Decreases in the volumetric transfer efficiencies $\eta_{C12}$, $\eta_{C23}$, $\eta_{C13}$, and $\eta_{C123}$ are assumed by using the abnormality decision section 95.

[Math. 11]
$$\eta_{C12} = \eta_{C13} < \eta_{C123} < \eta_{C23} \quad (11)$$

In the case where the number of at least one of the hydraulic pumps 21 to 23 connected to the hydraulic cylinder 11 is less than the maximum connection number, whenever the number of the at least one of the hydraulic pumps 21 to 23 connected to the hydraulic cylinder 11 is changed, the controller 9 according to the first embodiment of the present invention controls the switching operation of the switching valves 25 to 27 such that the combination of the hydraulic cylinder 11 and at least one of the hydraulic pumps 21 to 23 connected thereto is changed.

Specifically, whenever the required speed of the hydraulic cylinder 11 becomes a speed that can be achieved by the discharge flow rate of at least one of the hydraulic pumps the number of which is less than the maximum connection number during the operation of the hydraulic excavator 1, the pump-selecting section 931 selects at least one hydraulic pump for driving the hydraulic cylinder 11 from the hydraulic pumps 21 to 23 such that all of the combinations of the hydraulic cylinder 11 and at least one of the hydraulic pumps 21 to 23 connected thereto are selected in turns.

Figure 4:
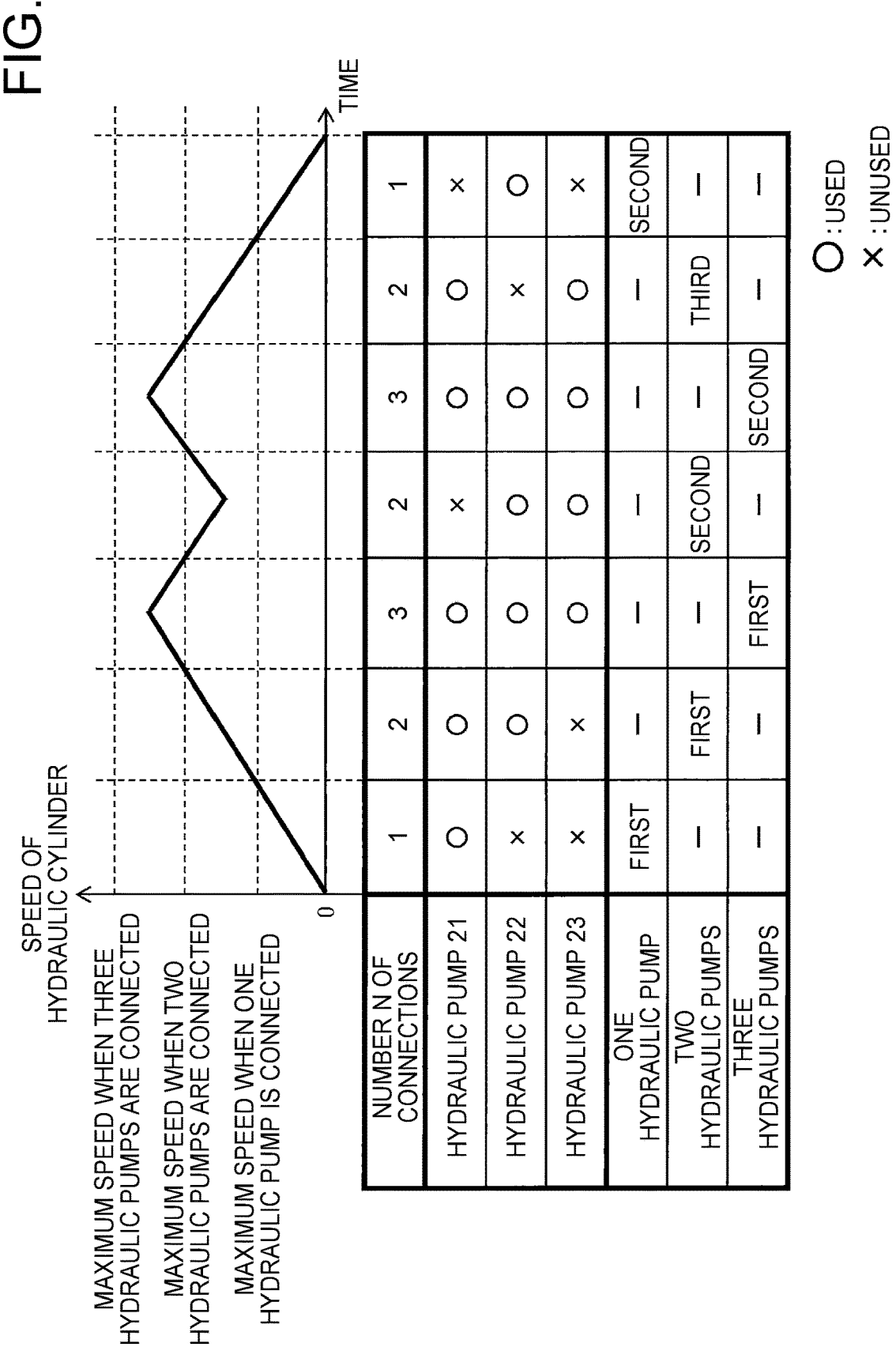
FIG. 4 illustrates the relationship between the speed of a hydraulic cylinder and the state of connection between the hydraulic cylinder and each of hydraulic pumps over time according to the first embodiment of the present invention.

FIG. 4 illustrates an example of the relationship between the speed of the hydraulic cylinder 11 and the state of connection between the hydraulic cylinder 11 and each of the hydraulic pumps 21 to 23 over time according to the first embodiment of the present invention.

As illustrated in FIG. 4, in the case where the number N of at least one of the hydraulic pumps 21 to 23 connected to the hydraulic cylinder 11 in the hydraulic circuit 100 is changed to 1, 2, 3, 2, 3, 2, and 1 in this order, during this time, a state where the number N of connections is 1 appears twice, a state where the number N of connections is 2 appears three times, and a state where the number N of connections is 3 appears twice. The combination of the hydraulic cylinder 11 and at least one of the hydraulic pumps connected thereto is changed between the first and second states where the number N of connections is 1. The hydraulic pump 21 is relevant to the first state. The hydraulic pump 22 is relevant to the second state.

The combination of the hydraulic cylinder 11 and at least one of the hydraulic pumps connected thereto is changed among the first, second, and third states where the number N of connections is 2. The hydraulic pump 21 and the hydraulic pump 22 are relevant to the first state. The hydraulic pump 22 and the hydraulic pump 23 are relevant to the second state. The hydraulic pump 21 and the hydraulic pump 23 are relevant to the third state. In the first and second states where the number N of connections is 3, the combination of the hydraulic cylinder 11 and at least one of the hydraulic pumps connected thereto is not changed because all of the hydraulic pumps 21 to 23 the number of which is the maximum connection number are connected to the hydraulic cylinder 11, and the hydraulic pump 21, the hydraulic pump 22, and the hydraulic pump 23 are relevant to the first state and the second state.

Subsequently, the hydraulic excavator 1 continues to operate, and the hydraulic pump 23 is connected to the hydraulic cylinder 11 in the third state where the number N of connections is 1 unlike the first state and the second state. In the states where the number N of connections is 2, there are three combinations of the hydraulic cylinder 11 and at least one of the hydraulic pumps connected thereto, and accordingly, the hydraulic pump 21 and the hydraulic pump 22 are connected to the hydraulic cylinder 11 in the fourth state as in the first state.

In the case where the combination of the hydraulic cylinder 11 and at least one of the hydraulic pumps 21 to 23 connected thereto is changed in accordance with such a rule, the volumetric-transfer-efficiency-calculating section 94 can calculate the volumetric transfer efficiencies $\eta_{C12}$, $\eta_{C23}$, $\eta_{C13}$, and $\eta_{C123}$ in all of the combinations for the minimum time. However, calculating the volumetric transfer efficiencies $\eta_{C12}$, $\eta_{C23}$, $\eta_{C13}$, and $\eta_{C123}$ in all of the combinations does not take a long time provided that the frequency of each combination of the hydraulic cylinder 11 and at least one of the hydraulic pumps 21 to 23 connected thereto does not greatly vary. Accordingly, the combination of the hydraulic cylinder 11 and at least one of the hydraulic pumps 21 to 23 connected thereto is not necessarily strictly changed in accordance with the above rule.

For example, the controller 9 may have a rule under which the combination of the hydraulic cylinder 11 and at least one of the hydraulic pumps 21 to 23 connected thereto is randomly changed whenever the number N of the at least one of the hydraulic pumps 21 to 23 connected to the hydraulic cylinder 11 increases or decreases, or a rule under which, when the number N of connections increases, the switching valve(s) corresponding to at least one of the hydraulic pumps connected before the number N of connections increases is maintained at the open position, and the switching valve(s) corresponding to the other hydraulic pump(s) is switched from the close position to the open position in order to reduce the number of the switching valves 25 to 27 that are switched by the pump-selecting section 931.

Under the latter rule, when the number N of at least one of the hydraulic pumps 21 to 23 connected to the hydraulic cylinder 11 increases from 1 to 2, for example, when the hydraulic pump 21 is disconnected from the hydraulic cylinder 11 in a state where the hydraulic pump 21 alone is connected to the hydraulic cylinder 11, and the other hydraulic pumps 22 and 23 are connected to the hydraulic cylinder 11 afresh, there is a possibility that the fuel consumption of the engine 20 or the operability of the hydraulic cylinder 11 declines.

To prevent this, a state where the hydraulic pump 21 alone is connected to the hydraulic cylinder 11 is maintained, and another hydraulic pump 22 or the hydraulic pump 23 is additionally connected to the hydraulic cylinder 11. This enables the energy saving of the hydraulic excavator 1 to be achieved and improves the operability of the hydraulic cylinder 11.

In the case where the hydraulic cylinder 11 is driven by the hydraulic pumps 21 to 23, when the abnormality decision section 95 assumes that any one of the volumetric transfer efficiencies $\eta_{C12}$, $\eta_{C23}$, $\eta_{C13}$, and $\eta_{C123}$ decreases, the information control section 96 controls and causes the monitor 5B to display, for example, a massage to an operator in the cab 5 to prompt the setting of the abnormality diagnosis mode. Consequently, the controller 9 according to the first embodiment of the present invention identifies a hydraulic pump of the hydraulic pumps 21 to 23 that presumably has abnormality, and the abnormality of the hydraulic pump to be diagnosed can be accurately detected in the abnormality diagnosis mode.

A process of detecting abnormality of each of the hydraulic pumps 21 to 23 by using the controller 9 according to the first embodiment of the present invention will now be described in detail with reference to the flowchart in FIG. 5. The process of detecting abnormality of each of the hydraulic pumps 21 to 23 is always performed while the hydraulic excavator 1 operates.

Figure 5:
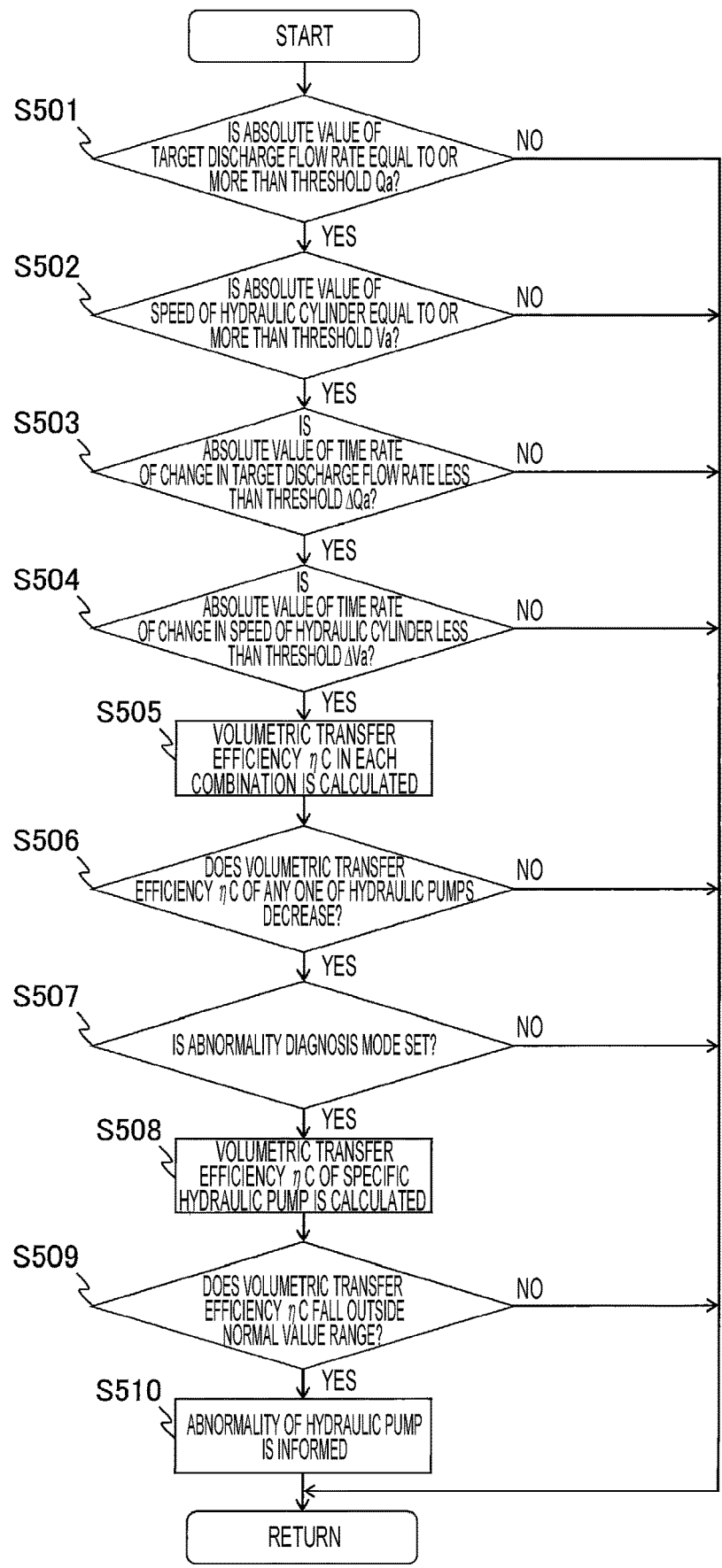
FIG. 5 is a flowchart illustrating the flow of control processes of the controller according to the first embodiment of the present invention.

As illustrated in FIG. 5, the controller 9 first decides whether the absolute value of the target discharge flow rate calculated by the target-discharge-flow-rate-calculating section 932 of the pump-switching valve control section 93 is equal to or more than a predetermined threshold Qa ((step (referred to below as S) 501)). In the case where the controller 9 decides that the absolute value of the target discharge flow rate calculated by the target-discharge-flow-rate-calculating section 932 is less than the threshold Qa (S501/No) at this time, the process at S501 is repeated.

In the case where the controller 9 decides that the absolute value of the target discharge flow rate calculated by the target-discharge-flow-rate-calculating section 932 is equal to or more than the threshold Qa (S501/Yes) at S501, the controller 9 decides whether the absolute value of the speed of the hydraulic cylinder 11 that is detected by the speed sensor 28 is equal to or more than a predetermined threshold Va (S502). In the case where the controller 9 decides that the absolute value of the speed of the hydraulic cylinder 11 that is detected by the speed sensor 28 is less than the threshold Va (S502/No) at this time, the processes from S501 are repeated.

In the case where the controller 9 decides that the absolute value of the speed of the hydraulic cylinder 11 that is detected by the speed sensor 28 is equal to or more than the threshold Va (S502/Yes) at S502, a process at S503 described later is performed. The above processes at S501 and S502 are relatively greatly affected by a leak of the hydraulic oil from portions other than the hydraulic pumps 21 to 23 when at least one of the target discharge flow rate of each of the hydraulic pumps 21 to 23 and the speed of the hydraulic cylinder 11 is too small.

In view of such a circumstance, the controller 9 determines the thresholds Qa and Va that are compared to the result of calculation by the target-discharge-flow-rate-calculating section 932 and the result of detection by the speed sensor 28 to start the process of detecting abnormality of each of the hydraulic pumps 21 to 23 only when the absolute value of the target discharge flow rate of each of the hydraulic pumps 21 to 23 and the absolute value of the speed of the hydraulic cylinder 11 are equal to or more than the thresholds Qa and Va. This enables the obtained volumetric transfer efficiency $\eta_C$ to appropriately reflect the state of each of the hydraulic pumps 21 to 23 and enables the accurate result of detection to be obtained.

The thresholds Qa and Va are determined in accordance with the accuracy required for the result of detection of abnormality of each of the hydraulic pumps 21 to 23 and the rapidity of the process of detection. For example, the range of the volumetric transfer efficiency $\eta_C$ that is determined as the normal value range can be narrow in a manner in which the thresholds Qa and Va are determined by using an approximation to the maximum speed of the hydraulic cylinder 11 that reaches under a very light load as a criterion, and the accuracy of the result of detecting abnormality of each of the hydraulic pumps 21 to 23 can be improved. However, this reduces frequency at which the hydraulic cylinder 11 meets the speed of criteria during the operation of the hydraulic excavator 1. Consequently, assuming a decrease in the volumetric transfer efficiency $\eta_C$ is more likely to take time. Accordingly, in the case where the rapidity of the process of detecting abnormality of each of the hydraulic pumps 21 to 23 is regarded as an important factor, the criterion for the hydraulic cylinder 11 that is used to determine the thresholds Qa and Va is preferably relaxed.

In some case, the volumetric transfer efficiency $\eta_C$ greatly varies due to the dynamic characteristics of the hydraulic system and the control system in the hydraulic circuit 100. A specific example of the variation in the volumetric transfer efficiency $1c$ due to the dynamic characteristics of the hydraulic system and the control system will now be described in detail with reference to FIG. 6 and FIG. 7.

Figure 6:
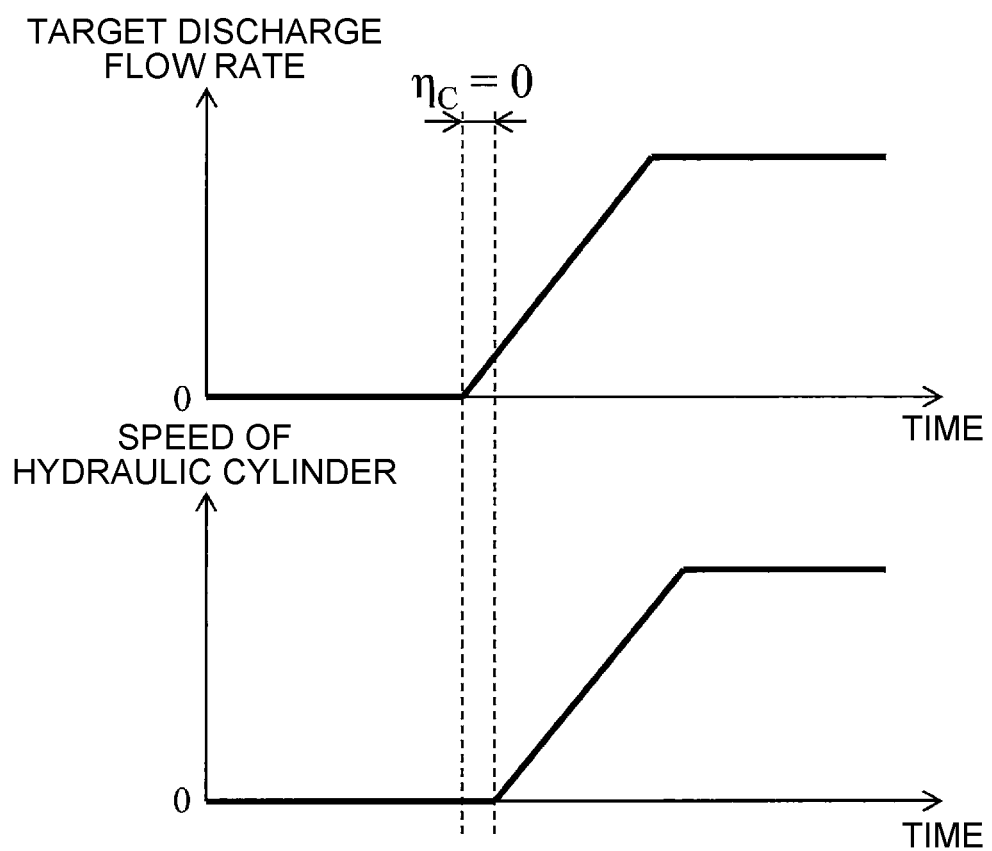
FIG. 6 illustrates an example of operational response of the hydraulic cylinder to the target discharge flow rate of each of the hydraulic pumps illustrated in FIG. 2.

As illustrated in FIG. 6, the response of the speed of the hydraulic cylinder 11 is delayed, and the hydraulic cylinder 11 is still at rest right after an operator operates the operating lever 5A to increase the target discharge flow rate of each of the hydraulic pumps 21 to 23 in a state where the target discharge flow rate of each of the hydraulic pumps 21 to 23 is 0 and the hydraulic cylinder 11 is at rest. At this time, the volumetric transfer efficiency $\eta_C$ calculated by the volumetric-transfer-efficiency-calculating section 94 is 0 according to the numerical formula (6).

Figure 7:
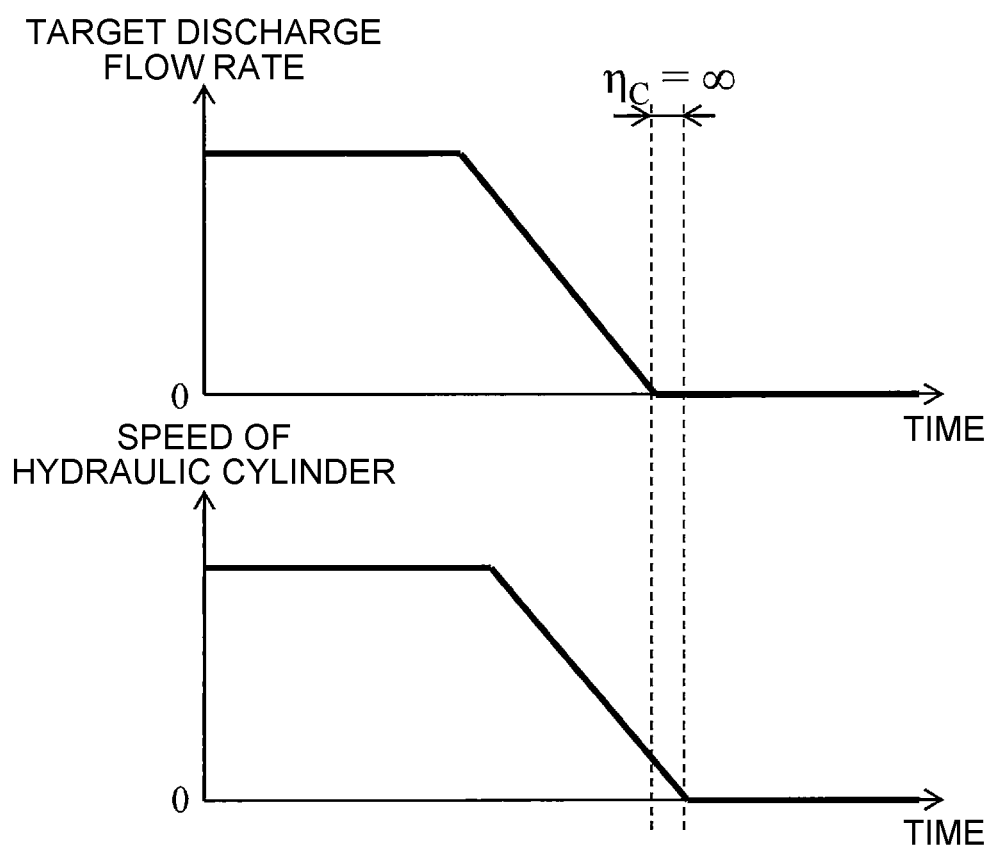
FIG. 7 illustrates another example of operational response of the hydraulic cylinder to the target discharge flow rate of each of the hydraulic pumps illustrated in FIG. 2.

As illustrated in FIG. 7, the response of the speed of the hydraulic cylinder 11 is delayed, and the hydraulic cylinder 11 is still moving right after an operator operates the operating lever 5A to adjust the target discharge flow rate of each of the hydraulic pumps 21 to 23 to be 0 in a state where the hydraulic cylinder 11 moves at a speed corresponding to the target discharge flow rate of each of the hydraulic pumps 21 to 23. At this time, the volumetric transfer efficiency $\eta_C$ calculated by the volumetric-transfer-efficiency-calculating section 94 is infinite according to the numerical formula (6).

In these cases, the volumetric transfer efficiency $\eta_C$ cannot be used as an indicator to decide whether each of the hydraulic pumps 21 to 23 is abnormal, and accordingly, it is necessary for the volumetric-transfer-efficiency-calculating section 94 to calculate the volumetric transfer efficiency $\eta_C$ in a state where the target discharge flow rate of each of the hydraulic pumps 21 to 23 and the speed of the hydraulic cylinder 11 are regarded as constant values.

In view of this, the volumetric-transfer-efficiency-calculating section 94 of the controller 9 calculates the volumetric transfer efficiency $\eta_C$ in each combination of the hydraulic cylinder 11 and at least one of the hydraulic pumps 21 to 23 connected thereto in accordance with a predetermined rule only when the absolute value of the time rate of change in the target discharge flow rate calculated by the target-discharge-flow-rate-calculating section 932 is less than a predetermined threshold $\Delta$Qa (S503/Yes) and the absolute value of the time rate of change in the speed of the hydraulic cylinder 11 that is detected by the speed sensor 28 is less than a predetermined threshold $\Delta$Va (S504/Yes) (S505). This eliminates the effect of the dynamic characteristics of the hydraulic system and the control system in the hydraulic circuit 100, and the accuracy of the result of calculation of the volumetric transfer efficiency $\eta_C$ can be improved.

Subsequently, the abnormality decision section 95 of the controller 9 receives the result of calculation by the volumetric-transfer-efficiency-calculating section 94 and assumes whether the volumetric transfer efficiency $\eta_C$ of any one of the combinations that is calculated by the volumetric-transfer-efficiency-calculating section 94 decreases (S506). In the case where the abnormality decision section 95 decides that the volumetric transfer efficiency $\eta_C$ of each combination does not decrease (S506/No) at this time, the processes from S501 are repeated.

In the case where the abnormality decision section 95 decides that the volumetric transfer efficiency $\eta_C$ of one of the combinations decreases (S506/Yes) at S506, a hydraulic pump of the hydraulic pumps 21 to 23 that presumably is abnormal is identified by using the volumetric transfer efficiency $\eta_C$, and the information control section 96 of the controller 9 displays, for example, a massage on the monitor 5B to prompt the setting of the abnormality diagnosis mode. The controller 9 decides whether the abnormality diagnosis mode is set by using the abnormality-diagnosis-mode switch 5C (S507). In the case where the controller 9 decides the abnormality diagnosis mode is not set (S507/No) at this time, the processes from S501 are repeated.

In the case where the controller 9 decides that the abnormality diagnosis mode is set (S507/Yes) at S507, the pump-switching valve control section 93 switches the switching valves 25 to 27 such that the hydraulic cylinder 11 is connected to the hydraulic pump identified by the abnormality decision section 95, that is, the hydraulic pump to be diagnosed in the abnormality diagnosis mode, and subsequently, the volumetric-transfer-efficiency-calculating section 94 calculates the volumetric transfer efficiency $\eta_C$ between the hydraulic cylinder 11 and the hydraulic pump to be diagnosed (S508).

Subsequently, the abnormality decision section 95 receives the result of calculation by the volumetric-transfer-efficiency-calculating section 94 and checks whether the volumetric transfer efficiency $\eta_C$ calculated by the volumetric-transfer-efficiency-calculating section 94 falls outside the predetermined normal value range (S509). In the case where the abnormality decision section 95 ascertains that the volumetric transfer efficiency $\eta_C$ falls within the normal value range (S509/No) at this time, the abnormality decision section 95 decides that the hydraulic pump to be diagnosed has no abnormality, and the processes from S501 are repeated.

In the case where the abnormality decision section 95 ascertains that the volumetric transfer efficiency $\eta_C$ falls outside the normal value range (S509/Yes) at S509, the abnormality decision section 95 decides that the hydraulic pump to be diagnosed is abnormal, the information control section 96 displays, for example, a massage on the monitor 5B to inform that the hydraulic pump is abnormal (S510), and the processes from S501 are repeated.

With the controller of the hydraulic excavator 1 thus configured according to the first embodiment of the present invention, the presence or absence of abnormality of each of the hydraulic pumps 21 to 23 can be readily decided without providing the hydraulic circuit 100 with an additional flow rate sensor in a manner in which the abnormality decision section 95 checks whether the target discharge flow rate calculated by the target-discharge-flow-rate-calculating section 932 and the volumetric transfer efficiency $\eta_C$ calculated from the speed of the hydraulic cylinder 11 that is detected by the speed sensor 28 fall outside the predetermined normal value ranges.

In addition, in the case where any one of the regulators 21D to 23D of the hydraulic pumps 21 to 23 malfunctions, the volumetric transfer efficiency $\eta_C$ calculated by the volumetric-transfer-efficiency-calculating section 94 exceeds the upper limit of the normal value, and information that any one of the hydraulic pumps 21 to 23 is abnormal is displayed on the monitor 5B. This enables an operator in the cab 5 to grasp abnormality of each of the hydraulic pumps 21 to 23 in an early stage and enables the operator to rapidly deal with the abnormality of each of the hydraulic pumps 21 to 23.

The controller of the hydraulic excavator 1 according to the first embodiment of the present invention thus reduces the equipment cost, enables abnormality of each of the hydraulic pumps 21 to 23 including control equipment such as the regulators 21D to 23D to be accurately detected, achieves excellent economy, and improves reliability of the process of detecting abnormality of each of the hydraulic pumps 21 to 23.

Second Embodiment

A second embodiment of the present invention differs from the above first embodiment in that, although the volumetric-transfer-efficiency-calculating section 94 according to the first embodiment defines the volumetric transfer efficiency $\eta_C$ as the ratio of the flow rate of the hydraulic oil flowing into the hydraulic cylinder 11 to the discharge flow rate of the hydraulic pump 21 and calculates the volumetric transfer efficiency $\eta_C$ on the discharge side of the hydraulic pumps 21 to 23 in the closed circuits 241 to 243, the volumetric-transfer-efficiency-calculating section 94 according to the second embodiment also calculates the volumetric transfer efficiency $\eta_C$ on the suction side of the hydraulic pumps 21 to 23 in the closed circuits 241 to 243.

Specifically, the volumetric-transfer-efficiency-calculating section 94 according to the second embodiment of the present invention calculates either the ratio of the flow rate of the hydraulic oil flowing into the hydraulic cylinder 11 to the discharge flow rate of each of the hydraulic pumps 21 to 23 or the ratio of the suction flow rate of each of the hydraulic pumps 21 to 23 to the flow rate of the hydraulic oil flowing from the hydraulic cylinder 11 as the volumetric transfer efficiency $\eta_C$ in accordance with a combination of a magnitude relationship between the pressures of the input-output ports 21A to 23A and 21B to 23B of each of the hydraulic pumps 21 to 23 that are detected by the pressure sensors 55, 56, 65, 66, 75, and 76 and a discharge direction of each of the hydraulic pumps 21 to 23 that is represented by the target command value obtained by the pump-switching valve control section 93. The other configuration of the second embodiment is the same as the configuration of the first embodiment. Like or corresponding components are designated by like reference signs, and a duplicated description is omitted.

A process of calculating the volumetric transfer efficiency $\eta_C$ by the volumetric-transfer-efficiency-calculating section 94 according to the second embodiment of the present invention will be described in detail below. To make the description easy to understand, what will now be described is the case where the switching valve 25 is switched to the open position 25A, the switching valves 26 and 27 are switched to the close positions 26B and 27B, and the hydraulic pump 21 alone drives the hydraulic cylinder 11. The same is true for the case where the hydraulic pump 22 or 23 alone drives the hydraulic cylinder 11, and a duplicated description is omitted.

In the hydraulic circuit 100 according to the second embodiment of the present invention, when the pressure of the hydraulic pump 21 on the discharge side is higher than the pressure on the suction side, the flow pass on the suction side of the hydraulic pump 21 in the closed circuit 241 and the flow pass 12 are connected to each other by using the flushing valve 33. For this reason, in the case where the hydraulic pump 21 cannot completely suck the hydraulic oil, an excess amount of the hydraulic oil in the flow pass on the suction side of the hydraulic pump 21 is discharged from the relief valve 32 into the hydraulic oil tank 29.

In the case where the amount of the hydraulic oil sucked by the hydraulic pump 21 is insufficient, the hydraulic oil discharged from the charge pump 31 is supplied to the inside of the flow pass on the suction side of the hydraulic pump 21 via the make-up valves 43, 44, 53, and 54. In this state, there is no direct correlation between the flow rate of the hydraulic oil flowing from the hydraulic cylinder 11 and the suction flow rate of the hydraulic pump 21, and accordingly, the result of calculation of the volumetric transfer efficiency $\eta_C$ on the suction side of the hydraulic pump 21 by the volumetric-transfer-efficiency-calculating section 94 does not accurately represent the state of suction by the hydraulic pump 21.

However, when the pressure of the hydraulic pump 21 on the suction side is higher than the pressure on the discharge side and is less than the pressures set to the relief valves 41, 42, 51, and 52, the flow pass on the discharge side of the hydraulic pump 21 in the closed circuit 241 and the flow pass 12 are connected to each other by using the flushing valve 33. For this reason, there is no passage via which the hydraulic oil flows into the flow pass 12 between the hydraulic cylinder 11 and the hydraulic pump 21 on the suction side of the hydraulic pump 21.

The pressure of the hydraulic pump 21 on the suction side is equal to or more than the pressures set to the make-up valves 43, 44, 53, and 54, and the hydraulic oil discharged from the charge pump 31 does not flow into the suction side of the hydraulic pump 21 via the make-up valves 43, 44, 53, and 54. Accordingly, the flow rate of the hydraulic oil flowing from the hydraulic cylinder 11 corresponds to the suction flow rate of the hydraulic pump 21. In this state, the speed of the hydraulic cylinder 11 is controlled by using the suction flow rate of the hydraulic pump 21.

In view of this, according to the second embodiment of the present invention, the volumetric transfer efficiency $\eta_C$ is defined as the ratio of the suction flow rate $Q_{IN}$ of the hydraulic pump 21 to the flow rate $Q_{OUT}$ of the hydraulic oil discharged from the hydraulic cylinder 11. That is, the volumetric transfer efficiency $\eta_C$ is expressed as the following numerical formula (12).

[Math. 12]

$$\eta_C = \frac{Q_{IN}}{Q_{OUT}} \quad (12)$$
$$= \frac{C \cdot R}{A \cdot V}$$

The smaller the volumetric transfer efficiency $\eta_C$ calculated by the numerical formula (12), the more the speed of the hydraulic cylinder 11 that is equal to the displacement command value is difficult to obtain. This means that the performance of the hydraulic pump 21 is reduced. The theoretical value of the volumetric transfer efficiency $\eta_C$ is 1, and the volumetric transfer efficiency $\eta_C$ is less than the theoretical value even when the hydraulic pump 21 normally operates. Accordingly, the process of deciding whether the hydraulic pump 21 is abnormal by the abnormality decision section 95 according to the second embodiment of the present invention is the same as in the first embodiment.

The normal value range of the volumetric transfer efficiency $\eta_C$ on the suction side of the hydraulic pump 21 may be determined in the same manner as the normal value range of the volumetric transfer efficiency $\eta_C$ on the discharge side of the hydraulic pump 21. Alternatively, the volumetric transfer efficiency $\eta_C$ on the suction side of the hydraulic pump 21 is actually measured in advance to determine the normal value range of the volumetric transfer efficiency $\eta_C$ apart from the normal value range of the volumetric transfer efficiency $\eta_C$ on the discharge side of the hydraulic pump 21. This enables the abnormality decision section 95 to more accurately decide the presence or absence of abnormality of the hydraulic pump 21.

A process of calculating the volumetric transfer efficiency $\eta_C$ by the volumetric-transfer-efficiency-calculating section 94 according to the second embodiment of the present invention will now be described in detail with reference to the flowchart in FIG. 8. In the following description, when the pressure of the input-output port 21A of the hydraulic pump 21 is higher than the pressure of the input-output port 21B, the sign of the difference between the pressures of the input-output ports 21A and 21B is positive, and when the pressure of the input-output port 21B of the hydraulic pump 21 is higher than the pressure of the input-output port 21A, the sign of the difference between the pressures of the input-output ports 21A and 21B is negative.

Figure 8:
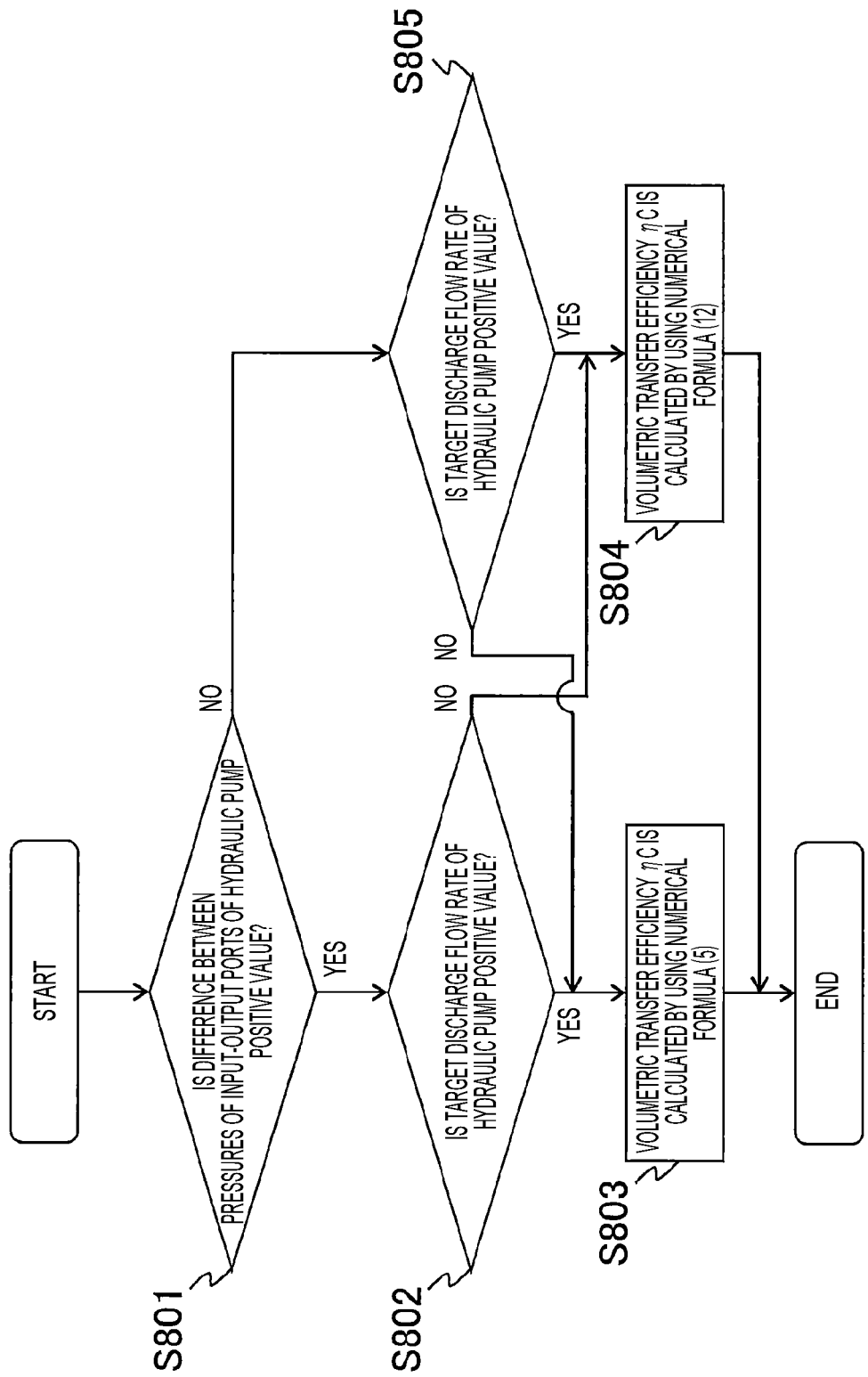
FIG. 8 is a flowchart illustrating the flow of processes for calculating a volumetric transfer efficiency by using a volumetric-transfer-efficiency-calculating section according to a second embodiment of the present invention.

As illustrated in FIG. 8, the volumetric-transfer-efficiency-calculating section 94 first receives the values detected by the pressure sensors 55 and 56 to decide whether the difference between the pressures of the input-output ports 21A and 21B of the hydraulic pump 21 that are detected by the pressure sensors 55 and 56 is a positive value (S801). In the case where the volumetric-transfer-efficiency-calculating section 94 decides that the difference between the pressures of the input-output ports 21A and 21B of the hydraulic pump 21 is a positive value (S801/Yes) at this time, the result of calculation by the target-discharge-flow-rate-calculating section 932 is inputted from the pump-switching valve control section 93, and whether the target discharge flow rate calculated by the target-discharge-flow-rate-calculating section 932 is a positive value is decided (S802). When the sign of the target discharge flow rate of the hydraulic pump 21 is positive, the hydraulic pump 21 sucks the hydraulic oil from the input-output port 21B and discharges the hydraulic oil from the input-output port 21A. When the sign of the target discharge flow rate of the hydraulic pump 21 is negative, the hydraulic pump 21 sucks the hydraulic oil from the input-output port 21A and discharges the hydraulic oil from the input-output port 21B.

In the case where the volumetric-transfer-efficiency-calculating section 94 decides that the target discharge flow rate calculated by the target-discharge-flow-rate-calculating section 932 is a positive value (S802/Yes) at S802, the volumetric transfer efficiency $\eta_C$ is calculated by using the numerical formula (5) (S803) to finish the process of calculating the volumetric transfer efficiency $\eta C$. In the case where the target discharge flow rate calculated by the target-discharge-flow-rate-calculating section 932 is decided to be a negative value (S802/No) at S802, the volumetric transfer efficiency $\eta_C$ is calculated by using the numerical formula (12) (S804) to finish the process of calculating the volumetric transfer efficiency $\eta C$.

In the case where the volumetric-transfer-efficiency-calculating section 94 decides that the difference between the pressures of the input-output ports 21A and 21B of the hydraulic pump 21 is a negative value (S801/No) at S801, the result of calculation by the target-discharge-flow-rate-calculating section 932 is inputted from the pump-switching valve control section 93, and whether the target discharge flow rate calculated by the target-discharge-flow-rate-calculating section 932 is a positive value is decided (S805).

In the case where the volumetric-transfer-efficiency-calculating section 94 decides that the target discharge flow rate calculated by the target-discharge-flow-rate-calculating section 932 is a positive value (S805/Yes) at S805, the volumetric transfer efficiency $\eta_C$ is calculated by using the numerical formula (12) (S804) to finish the process of calculating the volumetric transfer efficiency $\eta C$. In the case where the target discharge flow rate calculated by the target-discharge-flow-rate-calculating section 932 is decided to be a negative value (S805/No) at S805, the volumetric transfer efficiency $\eta_C$ is calculated by using the numerical formula (5) (S803) to finish the process of calculating the volumetric transfer efficiency $\eta C$.

According to the second embodiment of the present invention, the volumetric transfer efficiency $\eta_C$ in the case where the hydraulic pumps 21 to 23 drive the hydraulic cylinder 11 is expressed as the following numerical formula (13). Also in this case, the process of calculating the volumetric transfer efficiency $\eta_C$ by the volumetric-transfer-efficiency-calculating section 94 is performed by using the following numerical formula (13) in the same manner as in the above case of driving the hydraulic cylinder 11 by the hydraulic pump 21.

[Math. 13]

$$\eta_C = \frac{Q_{IN}}{Q_{OUT}} = \frac{(C_1 + C_2 + C_3) \cdot R}{A \cdot V} \tag{13}$$

With the controller of the hydraulic excavator 1 thus configured according to the second embodiment of the present invention, the same effects as in the above first embodiment are achieved, and the volumetric-transfer-efficiency-calculating section 94 can calculate not only the volumetric transfer efficiency $\eta_C$ on the discharge side of the hydraulic pumps 21 to 23 but also the volumetric transfer efficiency $\eta_C$ on the suction side of the hydraulic pumps 21 to 23 in a manner in which different definitions of the volumetric transfer efficiency $\eta_C$ are appropriately used depending on the fact that the hydraulic pumps 21 to 23 discharge the hydraulic oil into the high-pressure-side flow pass of the flow passes 14A to 16A and 14B to 16B, or the hydraulic pumps 21 to 23 suck the hydraulic oil from the high-pressure-side flow pass of the flow passes 14A to 16A and 14B to 16B. In this way, even when the operation of each of the hydraulic pumps 21 to 23 in one direction is normal but the operation thereof in the other direction is abnormal, such a state can be accurately detected as abnormality of each of the hydraulic pumps 21 to 23.

Third Embodiment

The configuration of a third embodiment of the present invention is based on the configuration of the above second embodiment but differs from that of the second embodiment in the following features. That is, the volumetric-transfer-efficiency-calculating section 94 according to the third embodiment of the present invention calculates either the ratio of the flow rate of the hydraulic oil flowing into the hydraulic cylinder 11 to the discharge flow rate of each of the hydraulic pumps 21 to 23 or the ratio of the suction flow rate of each of the hydraulic pumps 21 to 23 to the flow rate of the hydraulic oil flowing from the hydraulic cylinder 11 as the volumetric transfer efficiency $\eta_C$ in accordance with a combination of a magnitude relationship between the pressures of the input-output ports 21A to 23A and 21B to 23B of each of the hydraulic pumps 21 to 23 that are detected by the pressure sensors 55, 56, 65, 66, 75, and 76 and a direction of movement of the hydraulic cylinder 11 that is represented by the speed of the hydraulic cylinder 11 that is detected by the speed sensor 28. The other configuration of the third embodiment is the same as the configuration of the second embodiment. Like or corresponding components are designated by like reference signs, and a duplicated description is omitted.

The process of calculating the volumetric transfer efficiency $\eta_C$ by the volumetric-transfer-efficiency-calculating section 94 according to the third embodiment of the present invention will now be described in detail with reference to the flowchart in FIG. 9. Processes at S801, S803, and S804 illustrated in FIG. 9 are the same as the above processes at S801, S803, and S804 illustrated in FIG. 8, and differences from the second embodiment alone will be described.

Figure 9:
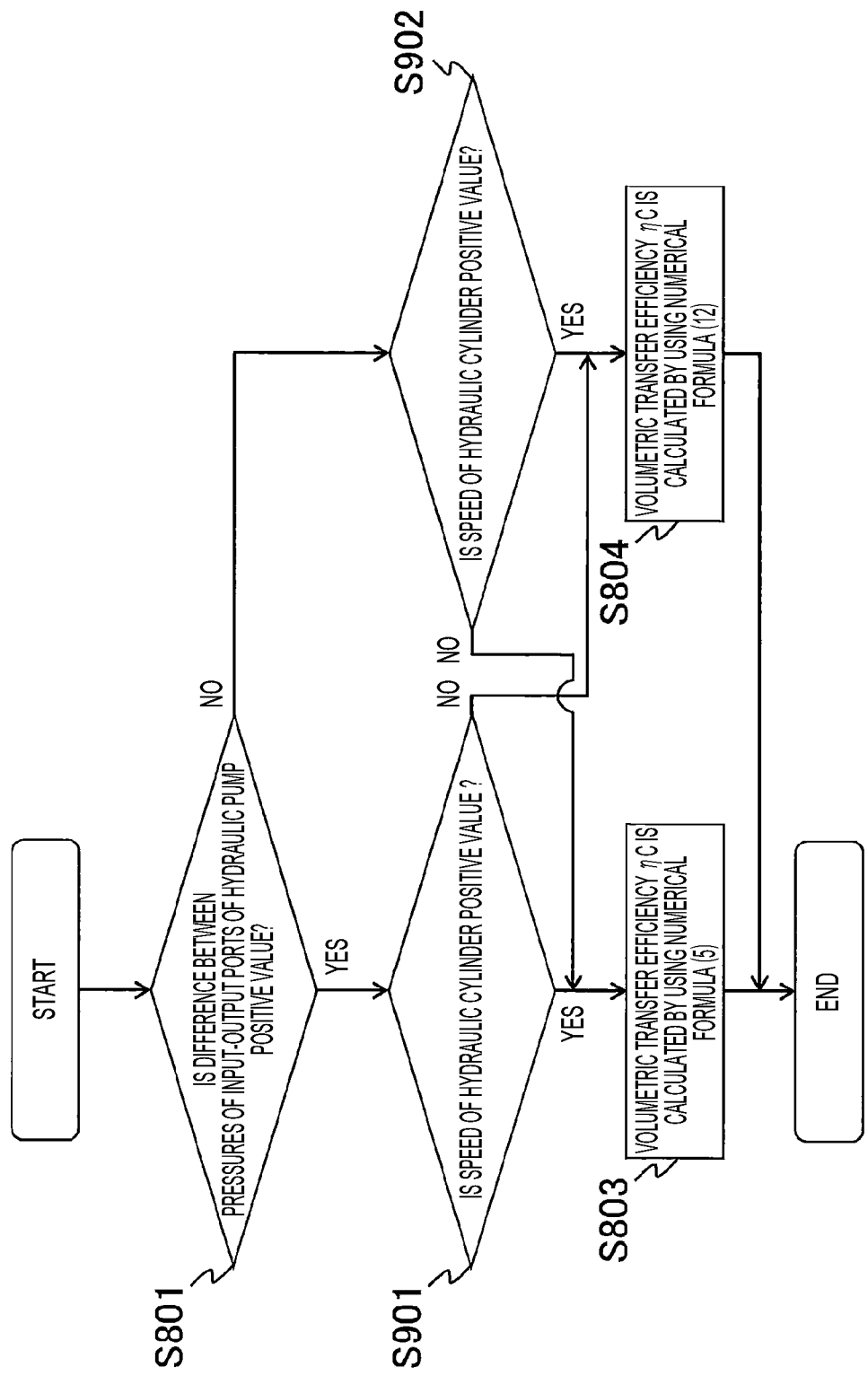
FIG. 9 is a flowchart illustrating the flow of processes for calculating the volumetric transfer efficiency by using a volumetric-transfer-efficiency-calculating section according to a third embodiment of the present invention.

As illustrated in FIG. 9, in the case where the volumetric-transfer-efficiency-calculating section 94 decides that the difference between the pressures of the input-output ports 21A and 21B of the hydraulic pump 21 is a positive value (S801/Yes) at S801, the value detected by the speed sensor 28 is inputted, and whether the speed of the hydraulic cylinder 11 that is detected by the speed sensor 28 is a positive value is decided (S901). In the case where the volumetric-transfer-efficiency-calculating section 94 decides that the speed of the hydraulic cylinder 11 is a positive value (S901/Yes) at this time, the process at S803 is performed. In the case where the volumetric-transfer-efficiency-calculating section 94 decides that the speed of the hydraulic cylinder 11 is a negative value (S901/No) at S901, the process at S804 is performed. When the sign of the speed of the hydraulic cylinder 11 is positive, the hydraulic cylinder 11 expands, and when the sign of the speed of the hydraulic cylinder 11 is negative, the hydraulic cylinder 11 contracts.

In the case where the volumetric-transfer-efficiency-calculating section 94 decides that the difference between the pressures of the input-output ports 21A and 21B of the hydraulic pump 21 is a negative value (S801/No) at S801, the value detected by the speed sensor 28 is inputted, and whether the speed of the hydraulic cylinder 11 that is detected by the speed sensor 28 is a positive value is decided (S902). In the case where the volumetric-transfer-efficiency-calculating section 94 decides that the speed of the hydraulic cylinder 11 is a positive value (S902/Yes) at this time, the process at S804 is performed. In the case where the volumetric-transfer-efficiency-calculating section 94 decides that the speed of the hydraulic cylinder 11 is a negative value (S902/No) at S902, the process at S803 is performed.

In the case where the hydraulic cylinder 11 moves in the direction opposite to the direction that the target discharge flow rate of each of the hydraulic pumps 21 to 23 indicates, the different numerical formulas are used to calculate the volumetric transfer efficiency $\eta_C$ even under the same conditions between the case where the volumetric-transfer-efficiency-calculating section 94 operates on the basis of the target discharge flow rate of each of the hydraulic pumps 21 to 23 according to the second embodiment and the case where the volumetric-transfer-efficiency-calculating section 94 operates on the basis of the direction of movement of the hydraulic cylinder 11 according to the third embodiment. At this time, in both cases of using the numerical formula (5) and the numerical formula (12), the volumetric transfer efficiency $\eta_C$ calculated by the volumetric-transfer-efficiency-calculating section 94 is a negative value, and the volumetric transfer efficiency $\eta_C$ apparently falls outside the normal value range. For this reason, abnormality of each of the hydraulic pumps 21 to 23 can be accurately detected.

With the controller of the hydraulic excavator 1 thus configured according to the third embodiment of the present invention, the volumetric-transfer-efficiency-calculating section 94 appropriately uses different definitions of the volumetric transfer efficiency $\eta_C$ depending on the fact that the hydraulic oil flows into the hydraulic cylinder 11 from the high-pressure-side flow pass of the flow passes 13A and 13B or the hydraulic oil flows into the high-pressure-side flow pass of the flow passes 13A and 13B from the hydraulic cylinder 11, and accordingly, the same effects as in the above second embodiment can be achieved.

The above embodiments of the present invention are described in detail to make the description of the present invention easy to understand, and the present invention is not necessarily limited to the embodiments including all of the configurations described above. Part of the configuration of one of the embodiments can be replaced with parts of the configurations of the other embodiments. Part of the configuration of one of the embodiments can be added to the configurations of the other embodiments.

Figure 10:
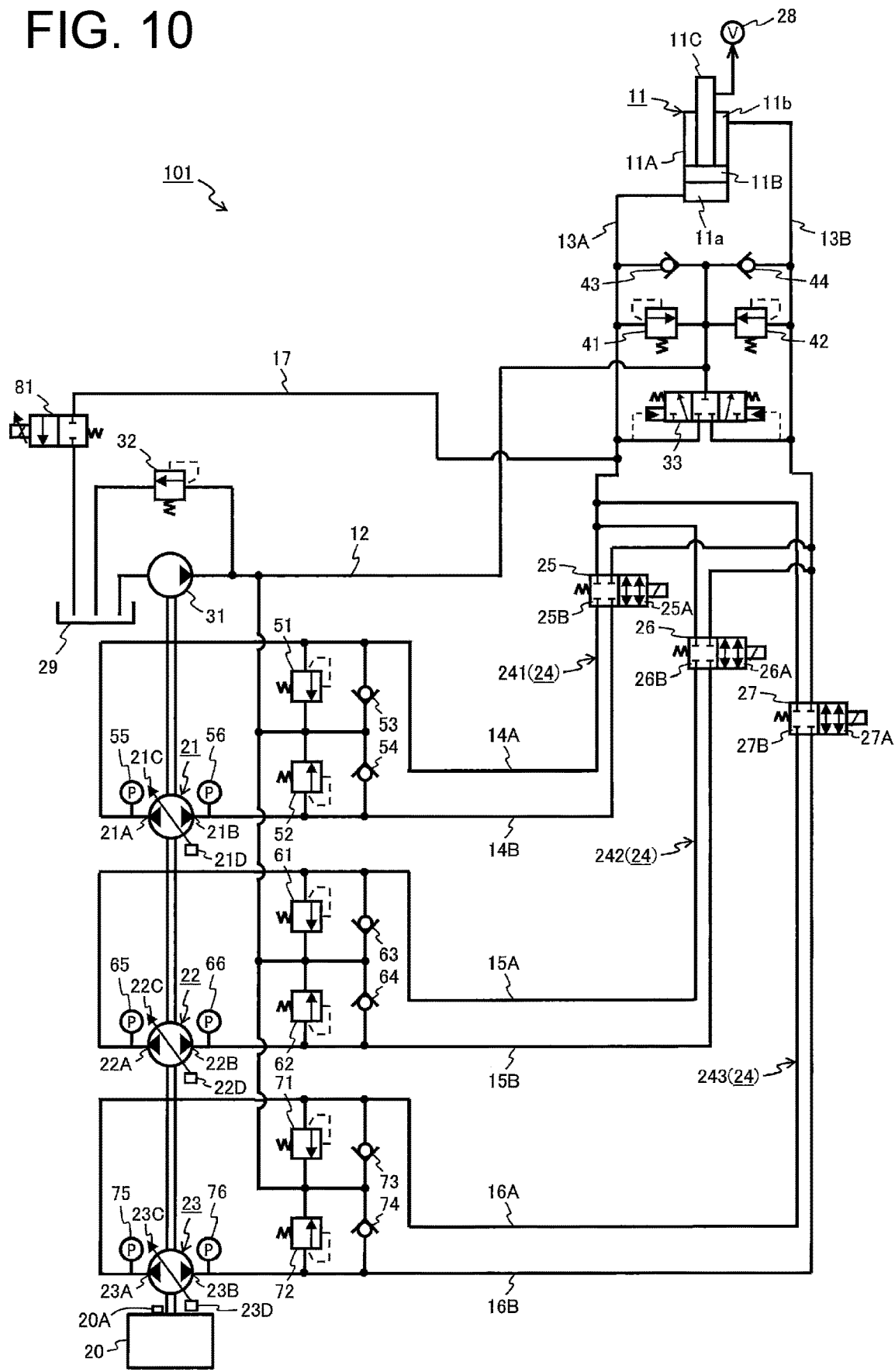
FIG. 10 illustrates another example of the configuration of the hydraulic circuit illustrated in FIG. 2.

In the hydraulic circuit 100 described according to the embodiments of the present invention, the speed of the hydraulic cylinder 11 is controlled in a manner in which the discharge flow rate of each of the hydraulic pumps 21 to 23 is adjusted for displacement control. The present invention, however, is not limited thereto. Specifically, in a displacement control system, the flow rate of the hydraulic oil flowing into the hydraulic cylinder 11 is controlled by using only the discharge flow rate of each of the hydraulic pumps 21 to 23, but the flow rate of the hydraulic oil flowing from the hydraulic cylinder 11 is controlled by using not only the suction flow rate of each of the hydraulic pumps 21 to 23 but also a proportional valve 81 the opening area of which is adjusted in accordance with control signals from the controller 9 as illustrated in FIG. 10.

Accordingly, the embodiments of the present invention can be used for a hydraulic circuit 101 including the proportional valve 81 disposed in a flow pass 17 branched from the flow pass 13A. In this case, the volumetric transfer efficiency $\eta_C$ is preferably defined in consideration for a command value to the proportional valve 81 in addition to the target discharge flow rate of each of the hydraulic pumps 21 to 23 and the speed of the hydraulic cylinder 11 with the flow rate of hydraulic oil that flows from the proportional valve 81 into the hydraulic oil tank 29 included.

According to the embodiments of the present invention described above, the number of the hydraulic pumps is 3. The present invention, however, is not limited thereto. The number of the hydraulic pumps may be 2, or 4 or more. In the case where the number of the hydraulic pumps is 2, there is a single combination of the hydraulic cylinder 11 and at least one of the hydraulic pumps connected thereto, and the abnormality decision section 95 decides the presence or absence of abnormality of each hydraulic pump from the volumetric transfer efficiency $\eta_C$ obtained while one of the hydraulic pumps alone drives the hydraulic cylinder 11 as in the case where the abnormality diagnosis mode is set by using the abnormality-diagnosis-mode switch 5C.

The hydraulic excavator 1 according to the embodiments of the present invention described above includes the speed sensor 28 that can directly detect the speed of the hydraulic cylinder 11. The present invention, however, is not limited thereto. For example, the speed of the hydraulic cylinder 11 may be detected in a manner in which a displacement of the hydraulic cylinder 11 is detected by using a displacement sensor with which a work machine such as the hydraulic excavator 1 is typically equipped instead of the speed sensor 28 or the angle of a joint of the front working device 4, in which the hydraulic cylinder 11 is driven, is detected by an angle sensor and converted into the displacement of the hydraulic cylinder 11, and a time derivative of the displacement of the hydraulic cylinder 11 is calculated.

The hydraulic excavator 1 according to the embodiments of the present invention described above includes the hydraulic cylinder 11 serving as the actuator, and the variable displacement hydraulic pumps 21 to 23 that drive the hydraulic cylinder 11. The present invention, however, is not limited thereto. The types of the actuator and the hydraulic pumps may be appropriately changed. For example, the actuator may be a single rod cylinder, a double rod cylinder, or one of various types of hydraulic motors such as a drive motor and a swing motor. The hydraulic pumps may be, for example, variable displacement vane pumps.

REFERENCE SIGNS LIST

1 . . . hydraulic excavator (work machine), 4a . . . boom cylinder (actuator), 4b . . . arm cylinder (actuator), 4c . . . bucket cylinder (actuator), 5A . . . operating lever, 5B . . . monitor (information device), 5C . . . abnormality-diagnosis-mode switch (abnormality-diagnosis-mode-setting section), 9 . . . controller, 11 . . . hydraulic cylinder (actuator), 12, 13A to 16A, 13B to 16B, 17 . . . flow pass
20 . . . engine, 20A . . . rotational speed sensor, 21 to 23 . . . hydraulic pump, 21A to 23A, 21B to 23B . . . input-output port, 21C to 23C . . . swash plate, 21D to 23D . . . regulator, 24 . . . merge circuit, 25 to 27 . . . switching valve, 28 . . . speed sensor (speed detector), 55, 56, 65, 66, 75, 76 . . . pressure sensor (pressure detector)
91 . . . target-speed-calculating section, 92 . . . target-driving-pressure-calculating section, 93 . . . pump-switching valve control section (target-command-value-obtaining section), 94 . . . volumetric-transfer-efficiency-calculating section, 95 . . . abnormality decision section, 96 . . . information control section, 100, 101 . . . hydraulic circuit, 241 to 243 . . . closed circuit, 931 . . . pump-selecting section, 932 . . . target-discharge-flow-rate-calculating section, 933 . . . displacement-command-value-calculating section

The invention claimed is:

1. A work machine comprising:
an actuator;
a plurality of hydraulic pumps that drive the actuator;
a merge circuit on which hydraulic oil discharged from the hydraulic pumps merges and acts on the actuator;
a controller that controls a discharge flow rate of each of the hydraulic pumps; and
a speed detector that detects a speed of the actuator,
wherein the controller is programmed to:
obtain a target command value of the discharge flow rate of each of the hydraulic pumps,
calculate a volumetric transfer efficiency representing a transfer efficiency of the hydraulic oil between the actuator and the hydraulic pumps on a basis of the obtained target command value and the speed of the actuator that is detected by the speed detector, and
decide whether any one of the hydraulic pumps is abnormal on a basis of the calculated volumetric transfer efficiency,
wherein the merge circuit includes a closed circuit on which the actuator and the hydraulic pumps are connected to each other in a closed circuit manner,
wherein each of the hydraulic pumps is formed of a two-way-tilting-type hydraulic pump including a pair of input-output ports via which the hydraulic oil is sucked or discharged,
wherein the closed circuit includes a pressure detector that detects pressures of the pair of input-output ports of each of the hydraulic pumps, and
wherein the controller is programmed to calculate either a ratio of a flow rate of the hydraulic oil flowing into the actuator to the discharge flow rate of each of the hydraulic pumps or a ratio of a suction flow rate of each of the hydraulic pumps to a flow rate of the hydraulic oil flowing from the actuator as the calculated volumetric transfer efficiency in accordance with a combination of a magnitude relationship between the pressures of the input-output ports of each of the hydraulic pumps that are detected by the pressure detector and a discharge direction of each of the hydraulic pumps that is represented by the obtained target command value.

2. The work machine according to claim 1, further comprising:
a switching valve that switches connection between the actuator and each of the hydraulic pumps,
wherein the controller is programmed to:
set an abnormality diagnosis mode in which abnormality of each of the hydraulic pumps is diagnosed, and
when the abnormality diagnosis mode is set and in a state where the actuator in one system is connected to only one of the hydraulic pumps by using the switching valve, decide whether the one of the hydraulic pumps is abnormal.

3. The work machine according to claim 1, further comprising:
a switching valve that switches connection between the actuator and each of the hydraulic pumps,
wherein the hydraulic pumps comprise three or more hydraulic pumps, and
wherein the controller is programmed to:
when a number of the hydraulic pumps connected to the actuator is less than a maximum number of connections that the switching valve permits, control switching operation of the switching valve such that a combination of the actuator and at least one of the hydraulic pumps connected thereto is changed whenever a number of the hydraulic pumps connected to the actuator is changed.

* * * * *